(12) United States Patent
Poole

(10) Patent No.: US 10,871,586 B2
(45) Date of Patent: Dec. 22, 2020

(54) DEVICE AND METHOD FOR MULTI-SHOT WAVEFIELD RECONSTRUCTION

(71) Applicant: CGG SERVICES SAS, Massy (FR)

(72) Inventor: Gordon Poole, East Grinstead (GB)

(73) Assignee: CGG SERVICES SAS, Massy (FR)

(*) Notice: Subject to any disclaimer, the term of this patent is extended or adjusted under 35 U.S.C. 154(b) by 822 days.

(21) Appl. No.: 15/597,577

(22) Filed: May 17, 2017

(65) Prior Publication Data
US 2018/0335534 A1 Nov. 22, 2018

(51) Int. Cl.
G01V 1/36 (2006.01)
G01V 1/28 (2006.01)
(Continued)

(52) U.S. Cl.
CPC .................. G01V 1/36 (2013.01); G01V 1/28 (2013.01); G01V 1/282 (2013.01); G01V 1/32 (2013.01);
(Continued)

(58) Field of Classification Search
USPC .......................................................... 702/16
See application file for complete search history.

(56) References Cited

U.S. PATENT DOCUMENTS 4,486,865 A  12/1984 Ruehle
7,715,988 B2  5/2010 Robertsson et al.
(Continued)

FOREIGN PATENT DOCUMENTS

GB   2256048 A    11/1992
WO   2015/159149 A2   10/2015
(Continued)

OTHER PUBLICATIONS

Fredrik Andersson et al., "Interpolation of multicomponent streamer data using extended structure tensors. Part 1: Interpolating the pressure field.", 2015 SEG New Orleans Annual Meeting, Oct. 18-23, 2015, pp. 3789-3793.
(Continued)

Primary Examiner — Paul D Lee
(74) Attorney, Agent, or Firm — Patent Portfolio Builders PLLC

(57) ABSTRACT

Method for reconstructing seismic data. The method includes receiving at a computing device an input seismic data set d related to plural shots emitted by one or more seismic sources; receiving at the computing device a positional data set $d_p$ relating to recording locations of the receivers that recorded the input seismic data set d; receiving at the computing device a receiver target location; calculating an adjusted receiver location based on (i) the positional data set $d_p$ and (ii) the receiver target location, wherein the adjusted receiver location substantially coincides with a receiver location from the positional data set $d_p$; calculating reconstructed seismic data $d_r$ at the adjusted receiver location using the input seismic data set d and the positional data set $d_p$; and correcting the seismic wave paths from the one or more seismic sources to the receivers based on the reconstructed seismic data $d_r$.

20 Claims, 14 Drawing Sheets

(51) Int. Cl.
*G01V 1/32* (2006.01)
*G01V 1/38* (2006.01)

(52) U.S. Cl.
CPC .......... *G01V 1/38* (2013.01); *G01V 2210/142* (2013.01); *G01V 2210/46* (2013.01); *G01V 2210/57* (2013.01)

(56) References Cited

U.S. PATENT DOCUMENTS

| | | | |
|---|---|---|---|
| 7,817,495 | B2 | 10/2010 | Ozbek et al. |
| 8,467,265 | B2 | 6/2013 | Van Manen et al. |
| 8,693,282 | B2 | 4/2014 | Ozdemir et al. |
| 8,699,297 | B2 | 4/2014 | Ozdemir et al. |
| 8,775,091 | B2 | 7/2014 | Robertsson |
| 8,811,115 | B2 | 8/2014 | Cambois |
| 9,043,155 | B2 | 5/2015 | Vassallo et al. |
| 9,045,028 | B2 | 6/2015 | Ichikawa |
| 9,091,787 | B2 | 7/2015 | Ji et al. |
| 9,182,512 | B2 | 11/2015 | Goujon et al. |
| 9,274,239 | B2 | 3/2016 | Vassallo et al. |
| 9,322,943 | B2 | 4/2016 | Soubaras |
| 9,335,430 | B2 | 5/2016 | Van Borselen et al. |
| 9,360,576 | B2 | 6/2016 | Frijlink |
| 9,435,905 | B2 | 9/2016 | Wang et al. |
| 9,442,209 | B2 | 9/2016 | Sollner et al. |
| 9,448,318 | B2 | 9/2016 | Martinez |
| 9,791,581 | B2* | 10/2017 | Siliqi .......... G01V 1/362 |
| 2010/0172208 | A1 | 7/2010 | Belani et al. |
| 2010/0202251 | A1 | 8/2010 | Ozdemir et al. |
| 2010/0211322 | A1 | 8/2010 | Vassallo et al. |
| 2010/0212909 | A1* | 8/2010 | Baumstein .......... G01V 11/00 166/369 |
| 2010/0329077 | A1 | 12/2010 | Ozbek et al. |
| 2010/0329078 | A1* | 12/2010 | Christie .......... G01V 1/28 367/40 |
| 2013/0135965 | A1* | 5/2013 | Ji .......... G01V 1/3808 367/21 |
| 2013/0163376 | A1 | 6/2013 | Poole |
| 2013/0163379 | A1 | 6/2013 | Poole |
| 2013/0176819 | A1 | 7/2013 | Poole |
| 2013/0194893 | A1* | 8/2013 | Nagarajappa .......... G01V 1/364 367/43 |
| 2013/0265849 | A1* | 10/2013 | Bunting .......... G01V 1/3826 367/16 |
| 2014/0050049 | A1 | 2/2014 | Kitchenside et al. |
| 2015/0212222 | A1 | 7/2015 | Poole |
| 2016/0187513 | A1 | 6/2016 | Poole et al. |
| 2017/0010375 | A1 | 1/2017 | Poole |
| 2017/0235001 | A1* | 8/2017 | Ram Rez-Perez .......... G01V 1/30 702/14 |
| 2017/0235003 | A1* | 8/2017 | Elboth .......... G01V 1/3808 367/17 |
| 2018/0210104 | A1* | 7/2018 | Terenghi .......... G01V 1/3808 |

FOREIGN PATENT DOCUMENTS

| | | |
|---|---|---|
| WO | 2016/023598 A1 | 2/2016 |
| WO | 2016/038458 A2 | 3/2016 |
| WO | 2016/075550 A1 | 5/2016 |

OTHER PUBLICATIONS

Fredrik Andersson et al., "Interpolation of multicomponent streamer data using extended structure tensors. Part 2: Interpolating the pressure field's depth derivative.", 2015 SEG New Orleans Annual Meeting, Oct. 18-23, 2015, pp. 3794-3798.

Y.I. Kamil et al., "Joint Crossline Reconstruction and 3D Deghosting of Shallow Seismic Events from Multimeasurement Streamer Data", 76th EAGE Conference & Exhibition 2014, Jun. 16-19, 2014, pp. 1-5.

N. Kazemi et al., "Data Reconstruction and Denoising of Different Wavefield Components Using Green's Theorem", 78th EAGE Conference & Exhibition 2016, May 30-Jun. 2, 2016, pp. 1-5.

Ali Özbek et al. "Crossline wavefield reconstruction from multi-component streamer data: joint interpolation and 3D up/down separation by generalized pursuit", SEG Denver 2010 Annual Meeting, Oct. 17-22, 2010, pp. 3599-3603.

Ali Özbek et al. "Crossline wavefield reconstruction from multi-component streamer data: Part 2—Joint interpolation and 3D up/down separation by generalized pursuit", Geophysics, Nov.-Dec. 2010, pp. WB69-WB85, vol. 75, No. 6.

Ali Özbek et al. "Joint 3D reconstruction and deghosting of multisensor streamer data by generalized matching pursuit", Istanbul International geophysical Conference and Oil & Gas Exhibition, Sep. 17-19, 2012, pp. 1-4.

G. Poole et al., "3D Source Designature Using Source-receiver Symmetry in the Shot Tau-px-py Domain", 77th EAGE Conference & Exhibition, Jun. 1-4, 2015, pp. 1-5.

Gordon Poole, "Pre-migration receiver de-ghosting and re-datuming for variable depth streamer data", SEG Houston 2013 Annual Meeting, Sep. 22-27, 2013, pp. 4216-4220.

Gordon Poole et al., "Shot-to-shot directional designature using near-field hydrophone data", SEG Houston 2013 Annual Meeting, Sep. 22-27, 2013, pp. 4236-4240.

Gordon Poole, "Wavefield separation using hydrophone and particle velocity components with arbitrary orientation", SEG Denver 2014 Annual Meeting, Oct. 26-31, 2014, pp. 1858-1862.

A.C. Ramirez et al., "Data-driven Interpolation of Multicomponent Data by Directionality Tensors", 77th EAGE Conference & Exhibition, Jun. 1-4, 2015, pp. 1-5.

Johan O.A. Robertsson et al., "On the use of multicomponent streamer recordings for reconstruction of pressure wavefields in the crossline direction", Geophysics, Sep.-Oct. 2008, pp. A45-A49, vol. 73, No. 5.

Johan O.A. Robertsson et al., "Reconstruction of pressure wavefields in the crossline direction using multicomponent streamer recordings", SEG Las Vegas 2008 Annual Meeting, Nov. 9-14, 2008, pp. 2988-2992.

Daniel Trad et al., "Latest views of the sparse Radon transform", Geophysics, Jan.-Feb. 2003, pp. 386-399, vol. 68, No. 1.

Massimiliano Vassallo et al., "Contributions of the horizontal and vertical components of particle velocity in 3D pressure wavefield reconstruction on dense receiver grids using generalized matching pursuit", SEG Las Vegas 2012 Annual Meeting, Nov. 4-9, 2012, pp. 1-5.

Massimiliano Vassallo et al., "Crossline wavefield reconstruction from multi-component streamer data: multichannel interpolation by matching pursuit", SEG Denver 2010 Annual Meeting, Oct. 17-22, 2010, pp. 3594-3598.

Massimiliano Vassallo et al., "Crossline wavefield reconstruction from multi-component streamer data: Part 1—Multichannel interpolation by matching pursuit (MIMAP) using pressure and its crossline gradient", Geophysics, Nov.-Dec. 2010, pp. WB53-WB67, vol. 75, No. 6.

Ping Wang et al., "3D joint deghosting and crossline interpolation for marine single-component streamer data", SEG Denver 2014 Annual Meeting, Oct. 26-31, 2014, pp. 3594-3598.

Ping Wang et al., "Joint hydrophone and accelerometer receiver deghosting using sparse Tau-P inversion", EG Denver 2014 Annual Meeting, Oct. 26-31, 2014, pp. 1894-1898.

Ping Wang et al., "Premigration deghosting for marine streamer data using a bootstrap approach", SEG Las Vegas 2012 Annual Meeting, Nov. 4-9, 2012, pp. 1-5.

Ping Wang et al., "Premigration deghosting for marine streamer data using a bootstrap approach i Tau-P domain", SEG Houston 2013 Annual Meeting, Sep. 22-27, 2013, pp. 4221-4225.

Singapore Examination Report for related/corresponding Singapore Application No. 10201804087W dated Dec. 12, 2019 (the references cited in the Singapore Examination Report are already of record).

(56) References Cited

OTHER PUBLICATIONS

Singapore Search Report and Written Opinion for related Singapore Application No. 10201804087W dated Jul. 9, 2019. (With the exception of the references cited herein, the remaining references cited in the Singapore Search Report and Written Opinion are already of record.).
Extended European Search Report, dated Oct. 12, 2018, for related European Application No. 18305512.8.
European Office Action for related/corresponding European Application No. 18305512.8, dated Jul. 10, 2020. (Documents D1, D2 and D3, cited in the European Office Action, were previously cited in the IDS filed Nov. 19, 2018.).

* cited by examiner

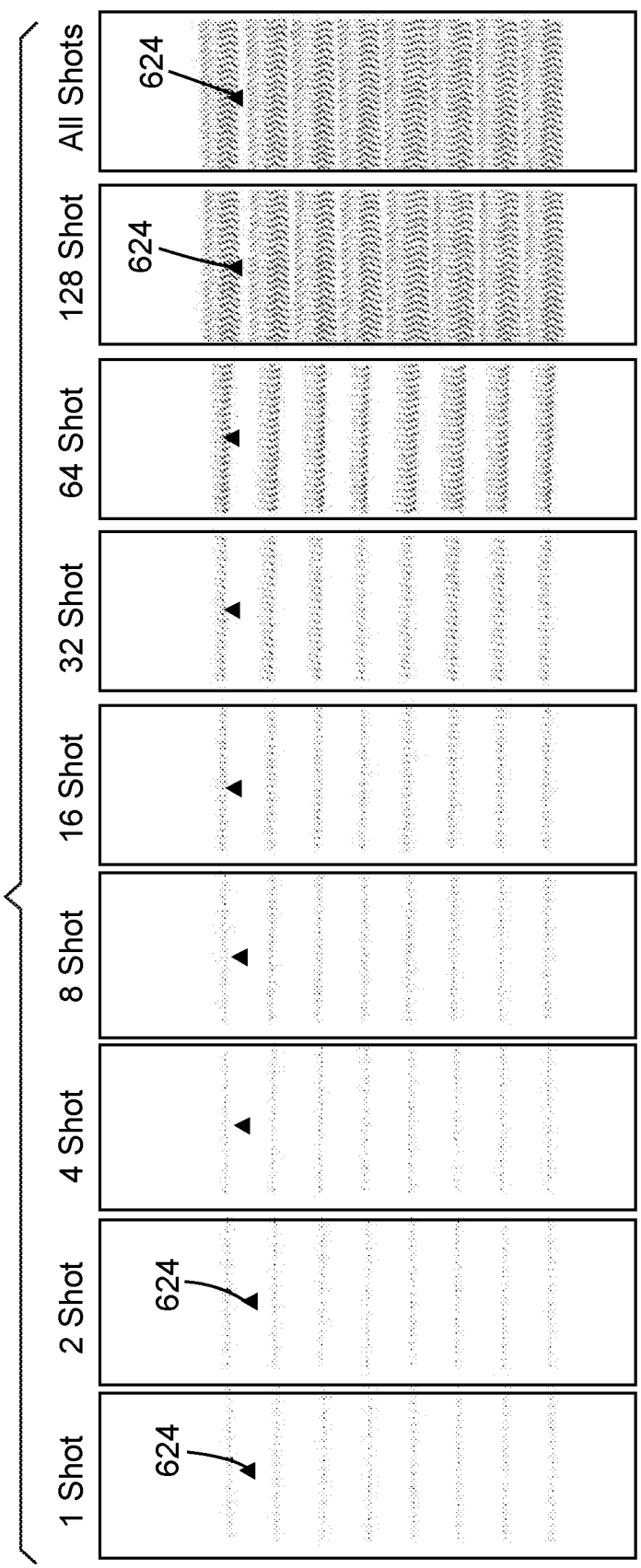

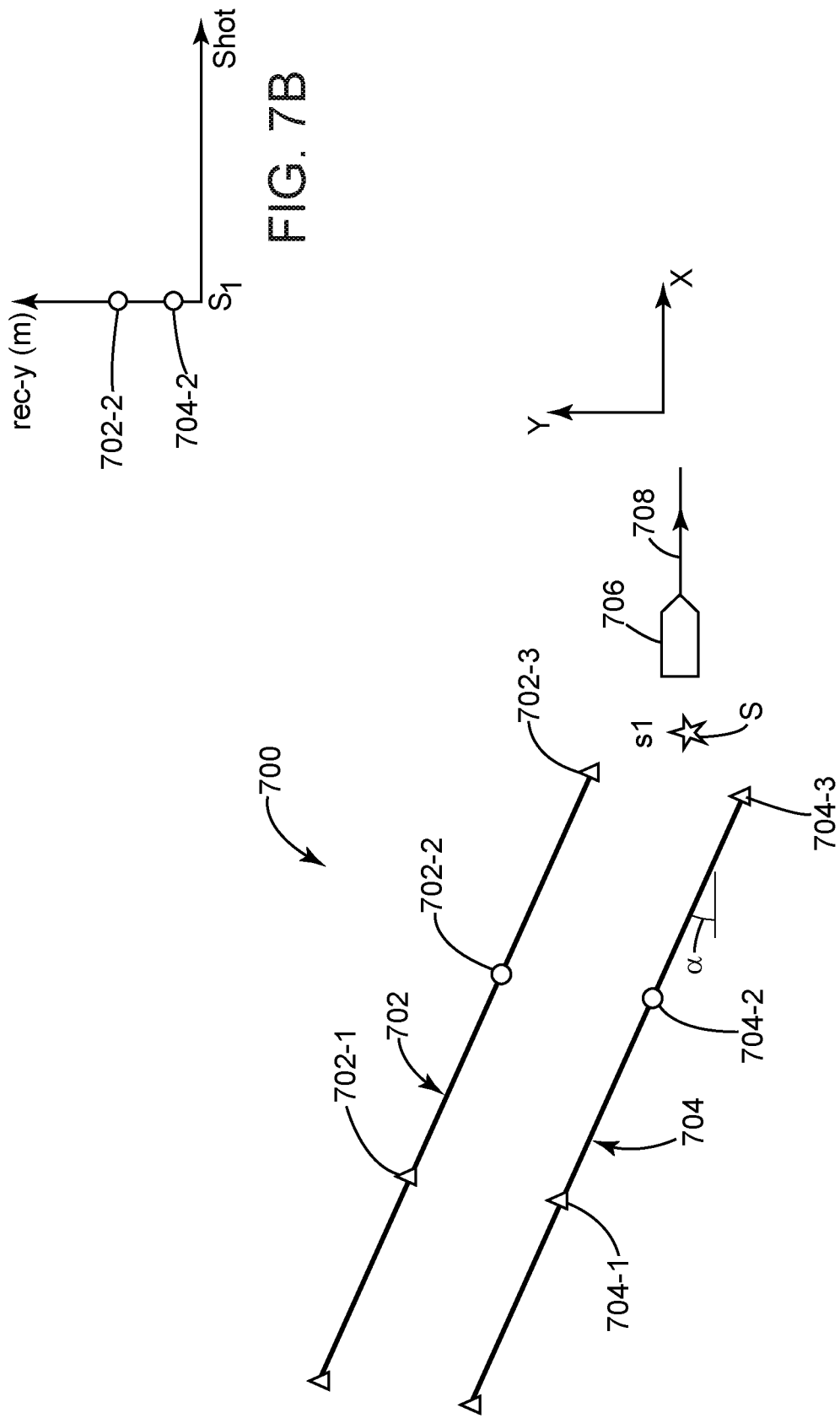

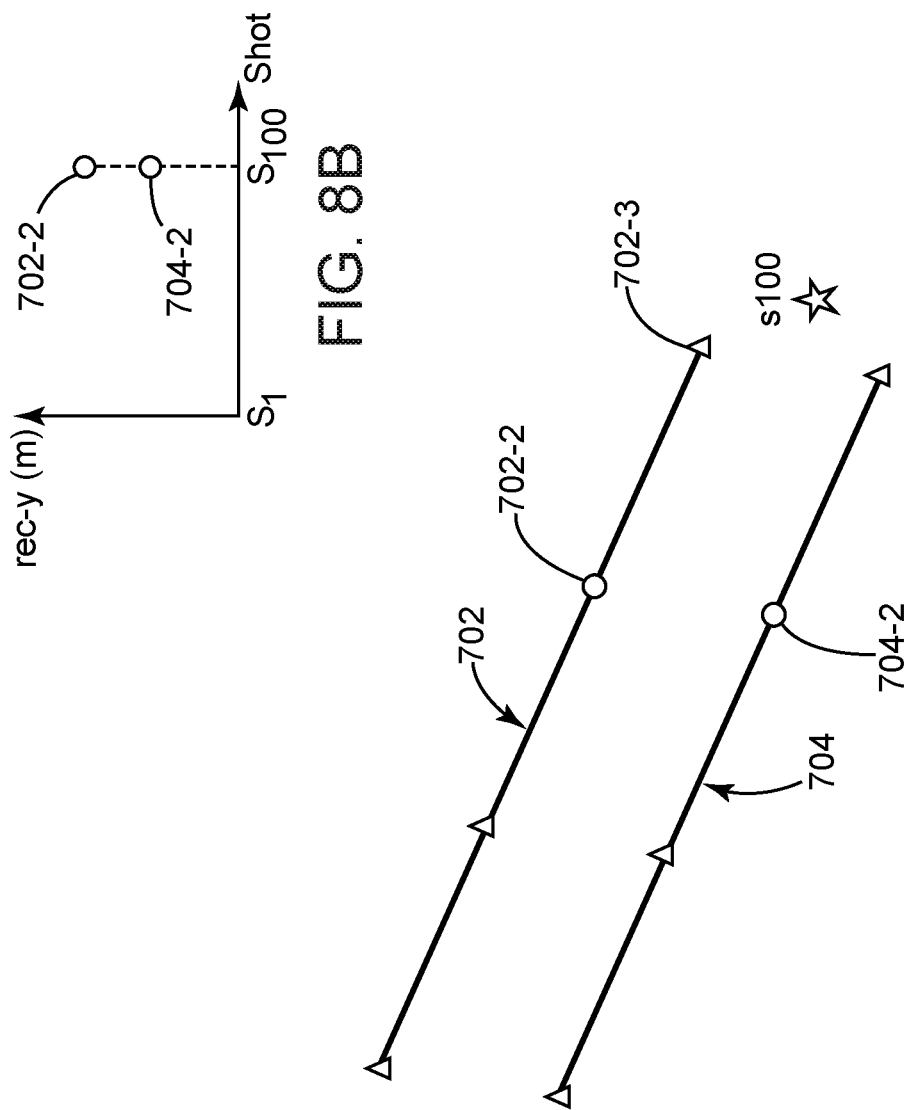

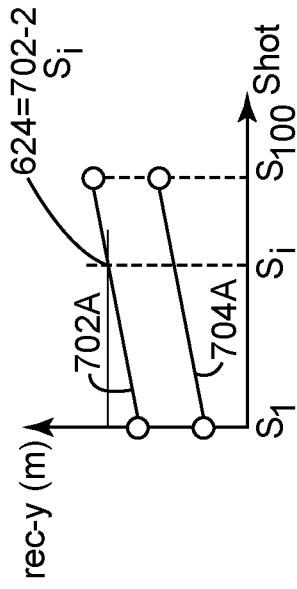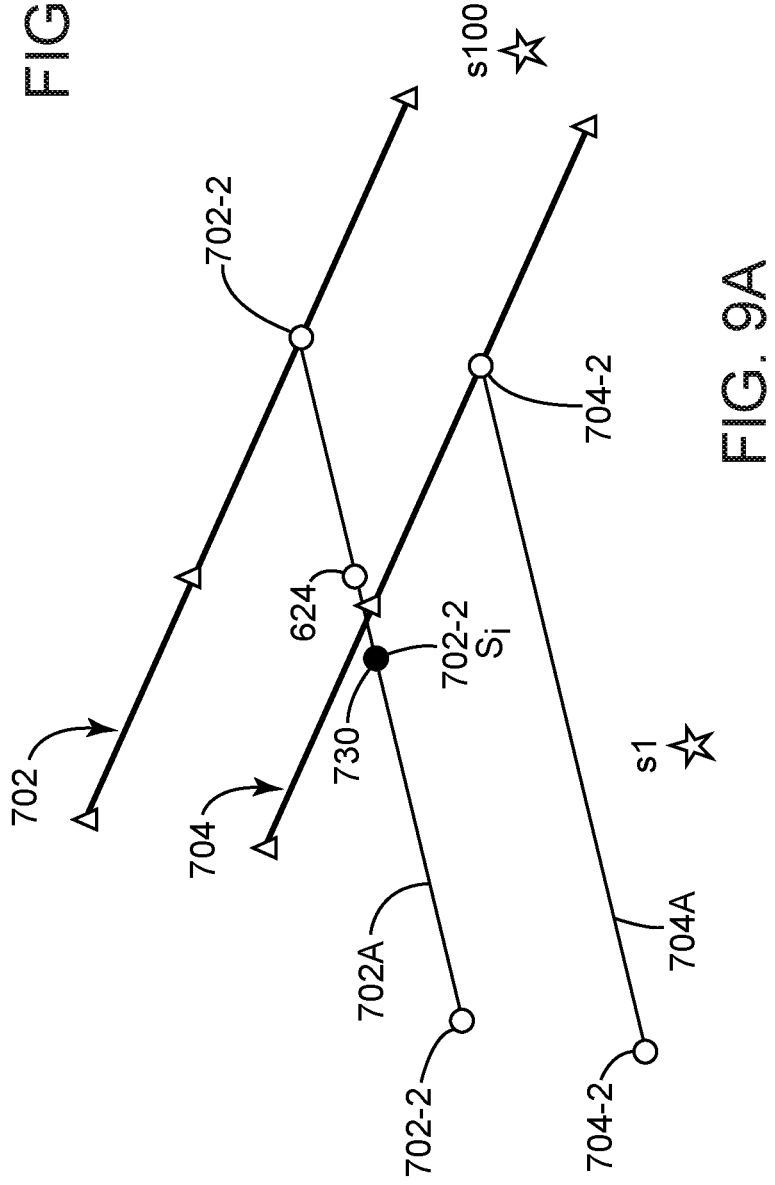
FIG. 9B
FIG. 9A

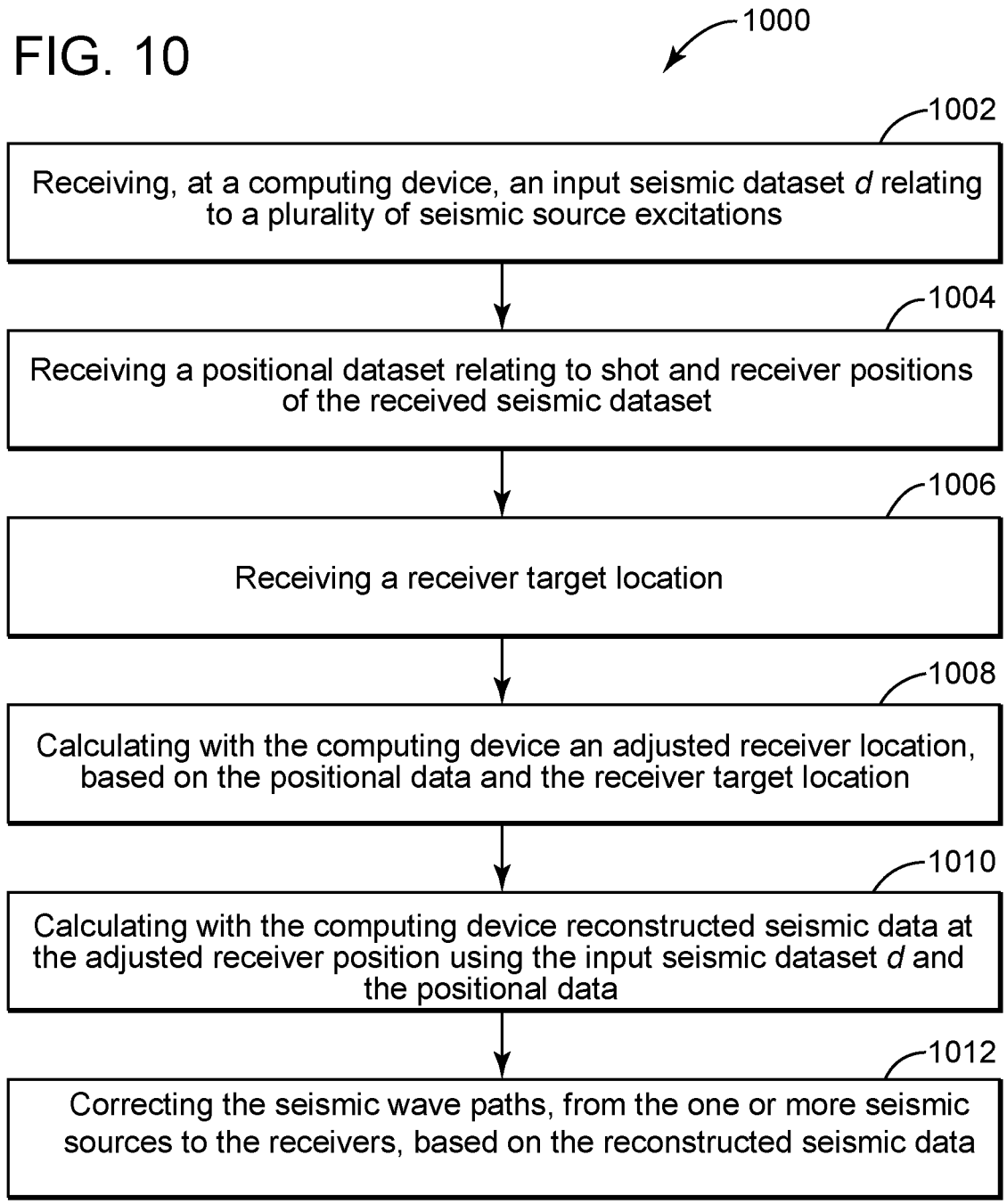

DEVICE AND METHOD FOR MULTI-SHOT WAVEFIELD RECONSTRUCTION

BACKGROUND

Technical Field

Embodiments of the subject matter disclosed herein generally relate to methods and systems and, more particularly, to mechanisms and techniques for reconstructing wavefields based on seismic data collected with receivers over plural shots.

Discussion of the Background

Marine seismic data acquisition and processing generate a profile (image) of the geophysical structure (subsurface) under the seafloor. While this profile does not provide an accurate location for oil and gas, it suggests, to those trained in the field, the presence or absence of oil and/or gas. Thus, providing a high-resolution image of the subsurface is an ongoing process for the exploration of natural resources, including, among others, oil and/or gas.

During a seismic gathering process, as shown in FIG. 1, a vessel 110 tows plural detectors 112, which are disposed along a cable 114. Cable 114 together with its corresponding detectors 112 are sometimes referred to, by those skilled in the art, as a streamer 116. Vessel 110 may tow plural streamers 116 at the same time. Streamers may be disposed horizontally, i.e., lie at a constant depth $z_1$ relative to the ocean surface 118. Also, plural streamers 116 may form a constant angle (i.e., the streamers may be slanted) with respect to the ocean surface or they may have a variable depth profile (Broadseis, CGG).

Still with reference to FIG. 1, vessel 110 may also tow a seismic source 120 configured to generate an acoustic wave 122a. Acoustic wave 122a propagates downward and penetrates the seafloor 124, eventually being reflected by a reflecting structure 126 (reflector R). Reflected acoustic wave 122b propagates upward and is detected by detector 112. For simplicity, FIG. 1 shows only two paths 122a corresponding to the acoustic wave. Parts of reflected acoustic wave 122b (primary) are recorded by various detectors 112 (recorded signals are called traces) while parts of reflected wave 122c pass detectors 112 and arrive at the water surface 118. Since the interface between the water and air is well approximated as a quasi-perfect reflector (i.e., the water surface acts as a mirror for acoustic waves), reflected wave 122c is reflected back toward detector 112 as shown by wave 122d in FIG. 1. Wave 122d is normally referred to as a ghost wave because it is due to a spurious reflection. Ghosts are also recorded by detector 112, but with a reverse polarity and a time lag relative to primary wave 122b if the detector is a hydrophone. The degenerative effect that ghost arrival has on seismic bandwidth and resolution is known. In essence, interference between primary and ghost arrivals causes notches, or gaps, in the frequency content recorded by detectors.

The recorded traces are used to image the subsurface (i.e., earth structure below surface 124) and to determine the position and presence of reflectors 126 and/or other characteristics of the earth. However, the recorded seismic data is discrete, i.e., if the locations where the seismic data was acquired, were to be plotted on a map 200, as illustrated in FIG. 2, there would be more empty space 202 for which there is no acquired seismic data than space 204 (where streamers 206 are present) where the seismic data is acquired. This empty space 202 creates gaps in the seismic data, which negatively influences the imaging process, thus resulting in poor quality imagining of the earth.

To compensate for the gaps in the acquired seismic data, the methods in U.S. Pat. Nos. 7,715,988 and 8,775,091 have proposed to use interpolation techniques for calculating new data at locations 208 between the streamers 206, to fill in the empty space 202.

However, the existing methods use locally measured data (e.g., data corresponding to a single shot excitation recorded by seismic receivers 210 and 212 located next to the position 208 to be estimated, in between the streamers) to infer the new data between the streamers. The problem with this approach is that the locally measured data might not be accurate, which negatively influences the new seismic data. Thus, there is a need to process more than the locally measured data to improve the accuracy of the estimated data and thus, the accuracy of the image and/or characteristics of the earth. Accordingly, it would be desirable to provide systems and methods with such capabilities.

SUMMARY

According to an embodiment, there is a method for reconstructing seismic data. The method includes receiving at a computing device an input seismic data set d related to plural shots emitted by one or more seismic sources, wherein the input seismic data set d is indicative of seismic wave paths from the one or more seismic source to receivers; receiving at the computing device a positional data set $d_p$ relating to recording locations of the receivers that recorded the input seismic data set d; receiving at the computing device a receiver target location; calculating, with the computing device, an adjusted receiver location based on (i) the positional data set $d_p$ and (ii) the receiver target location, wherein the adjusted receiver location substantially coincides with a receiver location from the positional data set $d_p$; calculating, with the computing device, reconstructed seismic data $d_r$ at the adjusted receiver location using the input seismic data set d and the positional data set $d_p$; and correcting the seismic wave paths from the one or more seismic sources to the receivers based on the reconstructed seismic data $d_r$.

According to another embodiment, there is a computing device for reconstructing seismic data. The computing device includes an input/output interface for receiving an input seismic data set d related to plural shots emitted by one or more seismic sources, wherein the input seismic data set d is indicative of seismic wave paths from the one or more seismic source to receivers, for receiving a positional data set $d_p$ relating to recording locations of the receivers that recorded the input seismic data set d, and for receiving a receiver target location. The computing device also includes a processor connected to the input/output interface and configured to calculate an adjusted receiver location based on (i) the positional data set $d_p$ and (ii) the receiver target location, wherein the adjusted receiver location substantially coincides with a receiver location from the positional data set $d_p$, calculate reconstructed seismic data $d_r$ at the adjusted receiver location using the input seismic data set d and the positional data set $d_p$, and correct the seismic wave paths from the one or more seismic sources to the receivers based on the reconstructed seismic data $d_r$.

According to still another embodiment, there are computing systems and computer-readable mediums including computer executable instructions, wherein the instructions, when executed by a processor, implement one or more of the methods as noted in the above paragraphs.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 6A-6D illustrate the effect of collecting input seismic data from multiple shots;

FIGS. 7A and 7B illustrate the receiver locations for a first shot;

FIGS. 8A and 8B illustrate the receiver locations for a later shot;

FIGS. 9A and 9B illustrate the receiver locations for the first and later shots;

FIG. 10 is a flowchart of a method for multi-shot wavefield reconstruction; and

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to pressure and/or particle velocity measurements associated with seismic data. However, the embodiments to be discussed next are not limited to these measurements. Other measurements, e.g., particle displacement and/or particle acceleration measurements, may be used instead of or in addition to particle velocity measurements. Thus, a generic name used herein for velocity, displacement, pressure gradient, and acceleration measurements is particle motion data.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, hydrophone and/or vertical particle velocity receiver data collected from receivers (located on streamers, ocean bottom cables, autonomous vehicles, etc.) are processed as now discussed.

Figure 3:
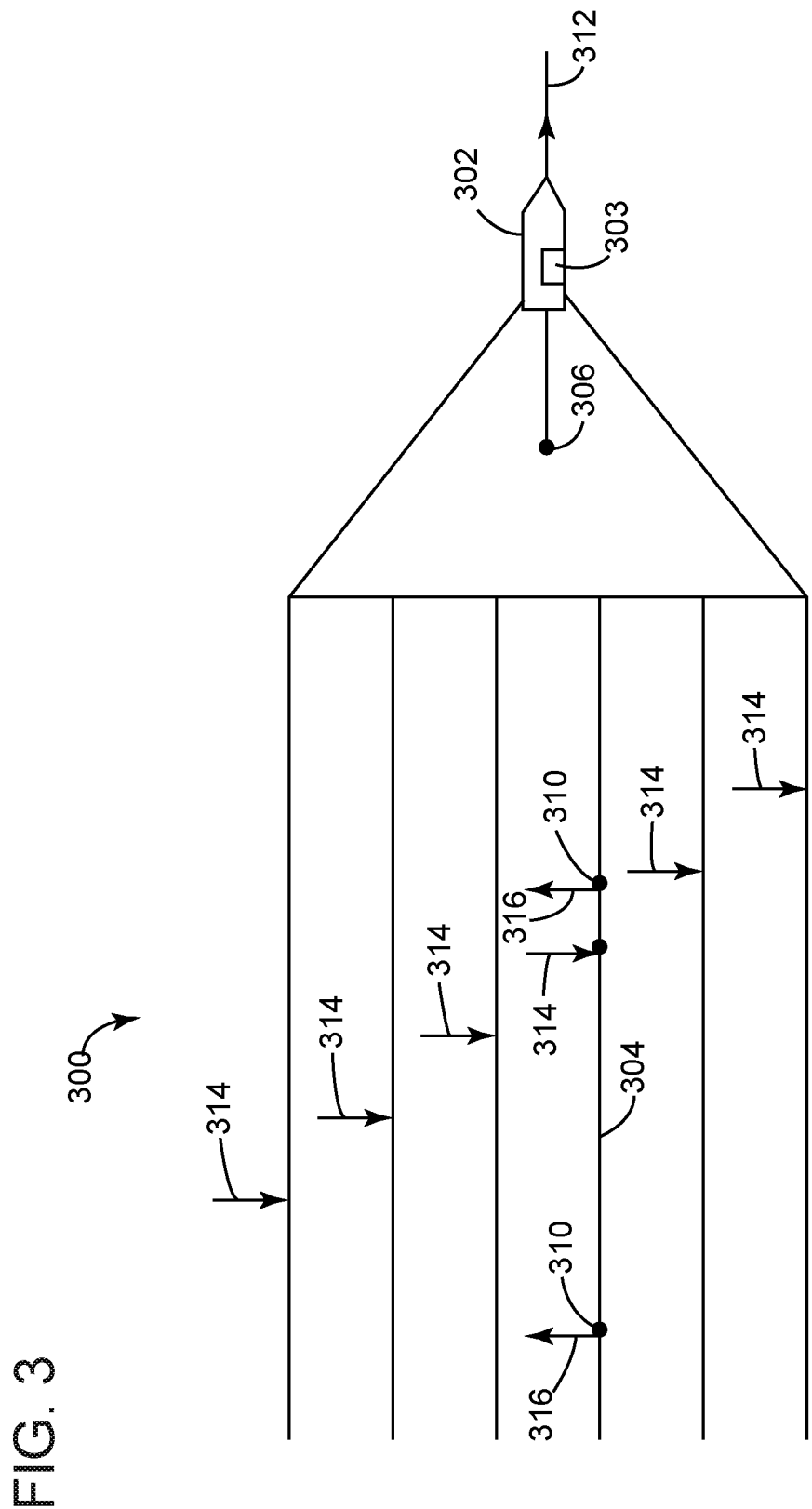
FIG. 3 illustrates a seismic acquisition system that uses birds to counteract the ocean currents so that the streamers are parallel to an inline direction.

Consider that a seismic data acquisition system 300, as illustrated in FIG. 3, includes a vessel 302 that tows plural streamers 304 and at least a source array 306. A source array, as discussed above, includes plural source elements. One or more streamers 304 have one or more birds 310. A bird is a device attached or integrated to the streamer (for example, located between two sections of the streamer) and configured to move the streamer up or down or left and right, so that a position of the streamer can be controlled. The bird may be programmed to achieve a desired position of the streamer during the seismic survey and/or may be controlled from the vessel 302, by a global controller 303, to achieve the desired positioning of the streamer. A streamer may carry plural birds.

As the vessel follows a predetermined path 312 (pre-plot path), the streamers experience ocean current forces 314, which displace the streamers with various amounts, depending on the intensity of the currents. For these reasons, the birds may be used to counteract these displacements, i.e., to apply an opposite force 316 (only one shown in the figure for simplicity) to neutralize the effect of current forces 314. In this way, the streamers move substantially parallel to the pre-plot path 312 and the seismic data is recorded neatly along lines parallel to the pre-plot path. Even with the use of birds, in practice, the presence of ocean currents will always result in some displacement from the desired positioning. Because most of the time the vessel's pre-plot path coincides with the inline direction, these two terms are used interchangeably in this application.

Figure 1:
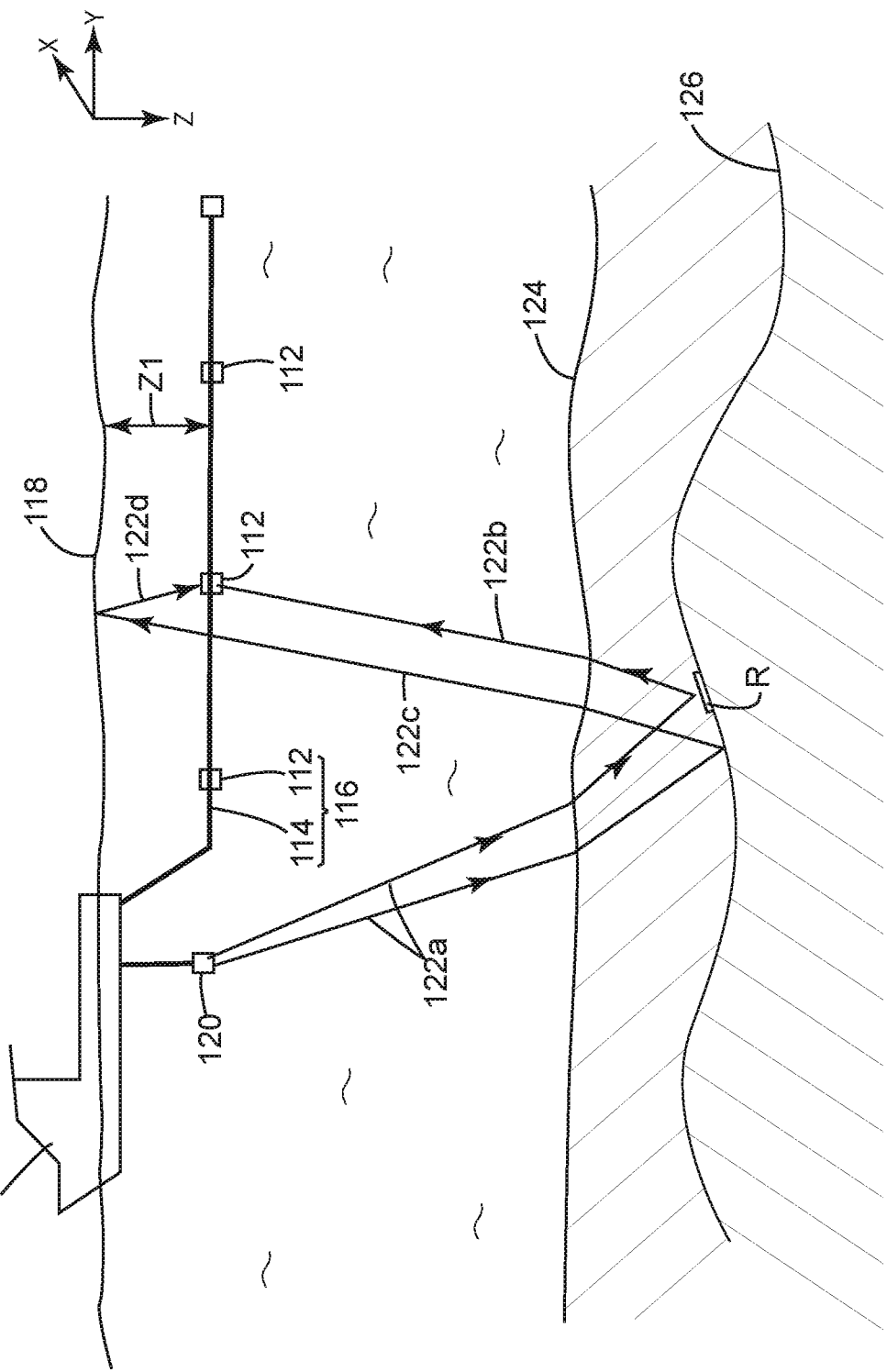
FIG. 1 is a schematic diagram of a conventional seismic data acquisition system having a horizontal streamer.
Figure 2:
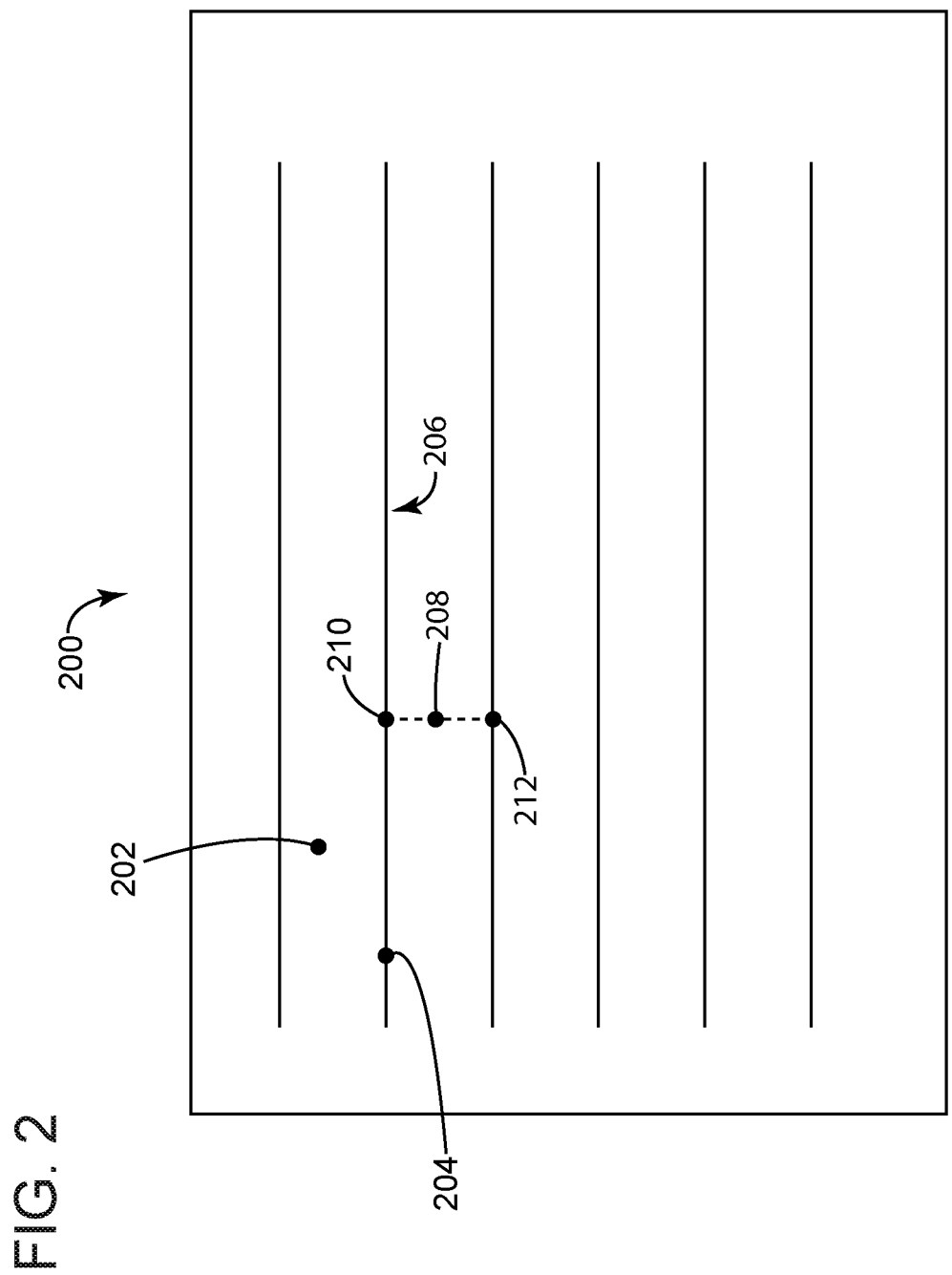
FIG. 2 illustrates receiver locations associated with acquired seismic data.

This means that the seismic data acquired with the system 300 has the gaps 202 illustrated in FIG. 2 and interpolating methods, as discussed in U.S. Pat. Nos. 7,715,988 and 8,775,091, may be applied to calculate seismic data between the streamers.

Streamer Spread Configuration

The inventor has realized that the acquired seismic data may be better reconstructed without interpolating the recorded seismic data at locations between the streamers and without fighting against the ocean currents as much as the traditional seismic survey systems do. As now discussed, according to an embodiment, the streamers (or streamer spread) are allowed to deviate from the inline direction during the seismic survey. The term "deviate" is understood herein to mean that a streamer makes a non-zero angle with the inline direction. In this regard, note that a vessel follows the pre-plot path and thus, the heads of the streamers, which are directly attached to the vessel, cannot deviate from the inline direction. However, the body of the streamers and especially their distant portions can deviate from the inline direction or pre-plot path. This means that the streamers are advancing along their pre-plot path in a controlled way, and the birds may be used to make them deviate from the inline direction if the ocean currents are not strong enough to achieve this deviation. In another embodiment, if the ocean currents are too strong, the birds may be used to reduce, but not cancel, the forces applied to the streamers by the ocean currents so that the streamers still deviate from the pre-plot angle. In still another embodiment, the birds are used to move the streamers in the horizontal plane (plane parallel to the water surface) for fanning or creating a feather angle during the seismic survey so that the streamers make a non-zero angle with the pre-plot path. These considerations and how to reconstruct wavefields at locations where some seismic data has been acquired are now discussed.

Figure 4:
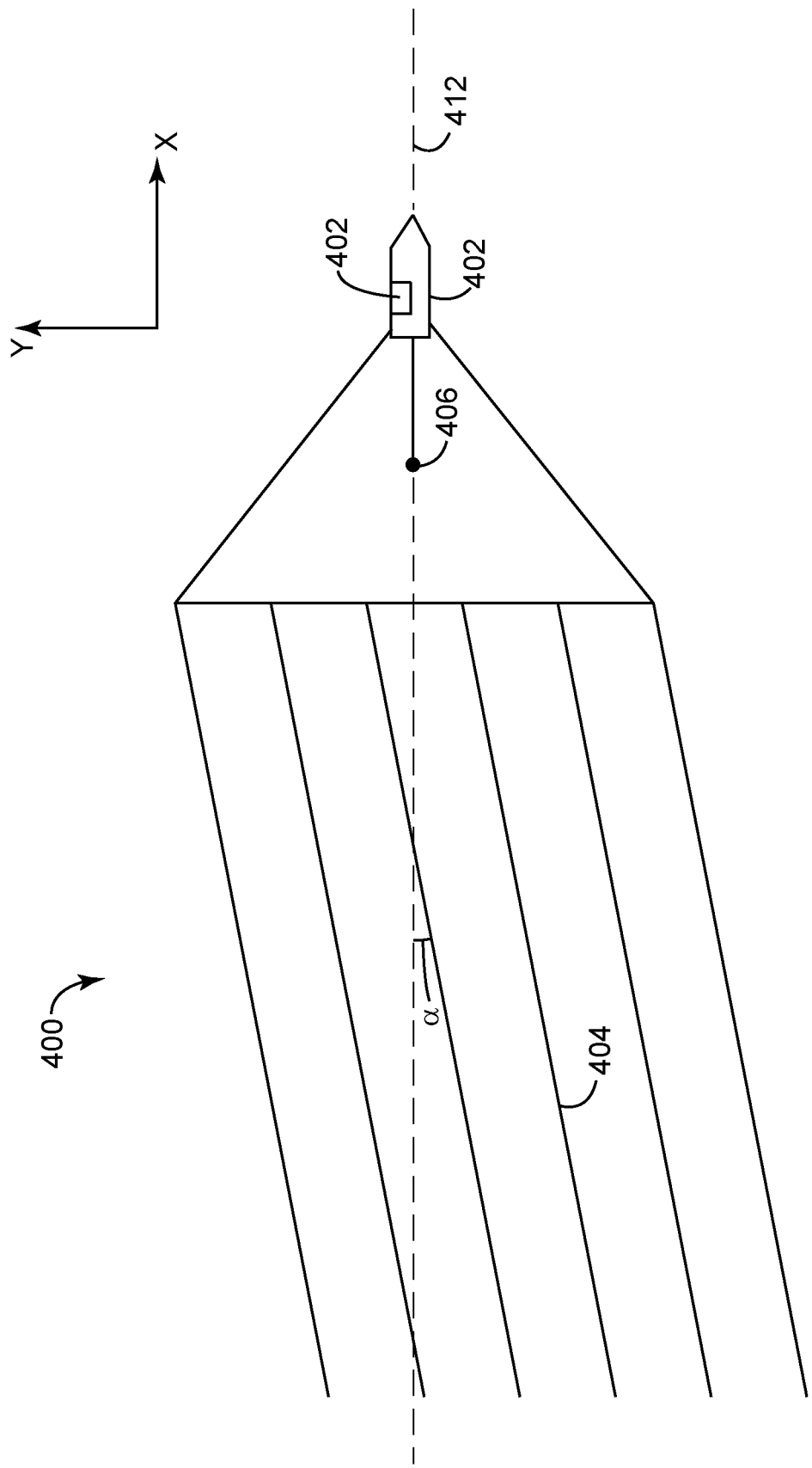
FIG. 4 illustrates a seismic acquisition system in which the streamers are not parallel to the inline direction.
Figure 5:
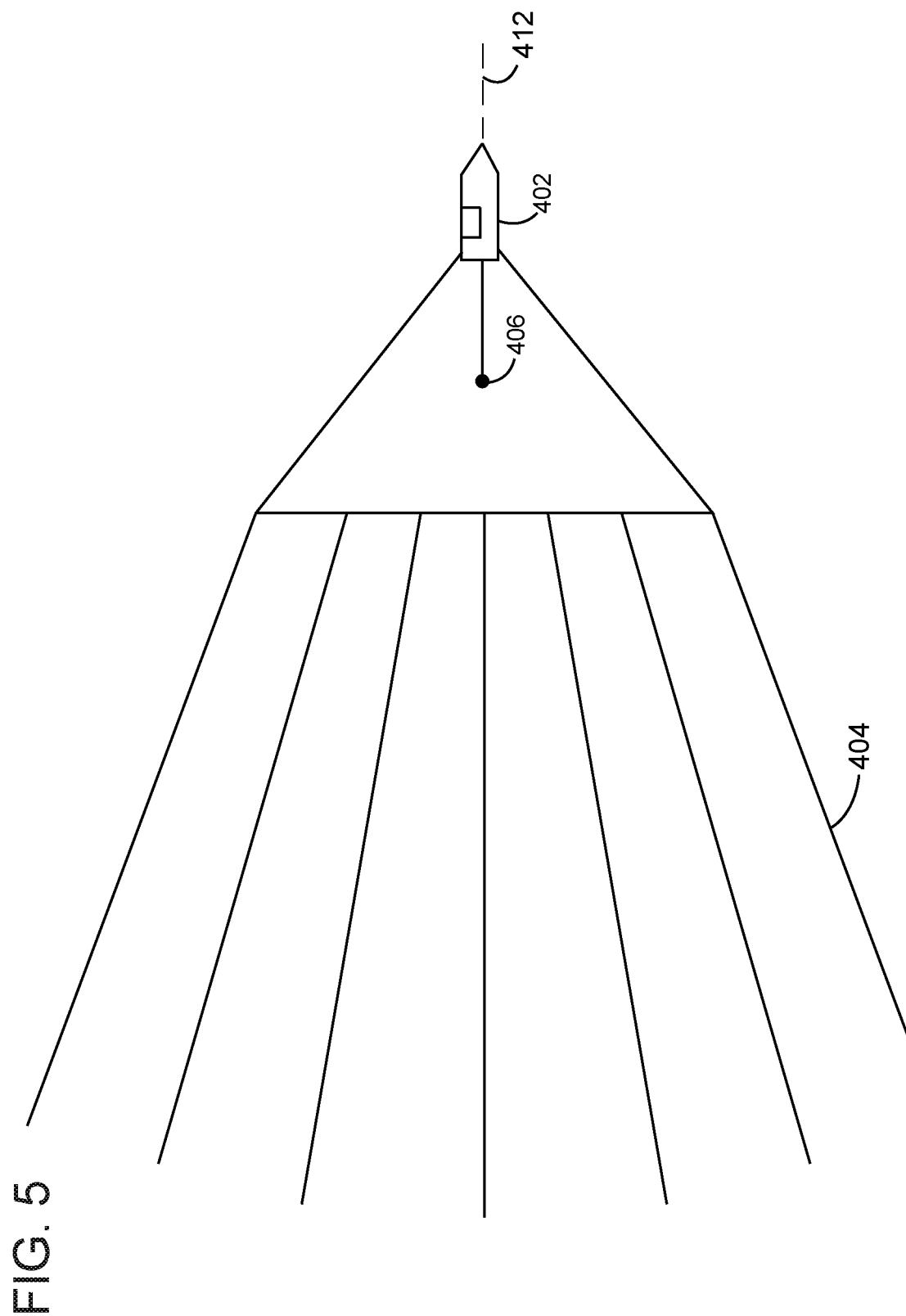
FIG. 5 illustrates another seismic acquisition system in which the streamers are not parallel to the inline direction.

FIG. 4 shows a seismic acquisition system 400 that includes a vessel 402, controller 403, plural streamers 404, and source array 406. Pre-plot path 412 is shown being oriented along the inline direction X and thus, perpendicular on the cross-line direction Y. The inline and cross-line directions are in the water surface plane, which implies that FIG. 4 is a top view of the acquisition system. A streamer 404 makes a non-zero angle α with the pre-plot path 412. This angle is called herein a deviation angle and it is achieved by various means: (1) allowing the streamers to drift with the ocean currents if the currents are not too strong, (2) counterbalancing the forces applied by the ocean currents with the birds, but not cancelling the ocean current forces, (3) applying forces with the birds on the streamers to maintain the deviation angle (for this specific case, the art uses the term feathering angle), (4) applying forces with the birds on the streamers to fan out the streamers (as illustrated in FIG. 5). For the scenario shown in FIG. 5, each streamer may make a different angle with the pre-plot path. While FIG. 4 shows all the streamers making the same deviation angle with the pre-plot path, this is not a requirement for the method to be discussed.

For illustrating some of the novel concepts, consider the acquisition system 400 illustrated in FIG. 4. Also, consider that the deviation angle α may change along the length of the streamer 404, i.e., the streamer does not have to be a straight line in the water surface plane. Further, consider that vessel 402 moves along the pre-plot path 412 with a constant speed (e.g., 8 km/h) and shoots the source array 406 with a given time period T, e.g., 10 s or a given space period, e.g., 35 m. Other numbers are possible. The source array may be shot with any known mode.

Figure 6A:
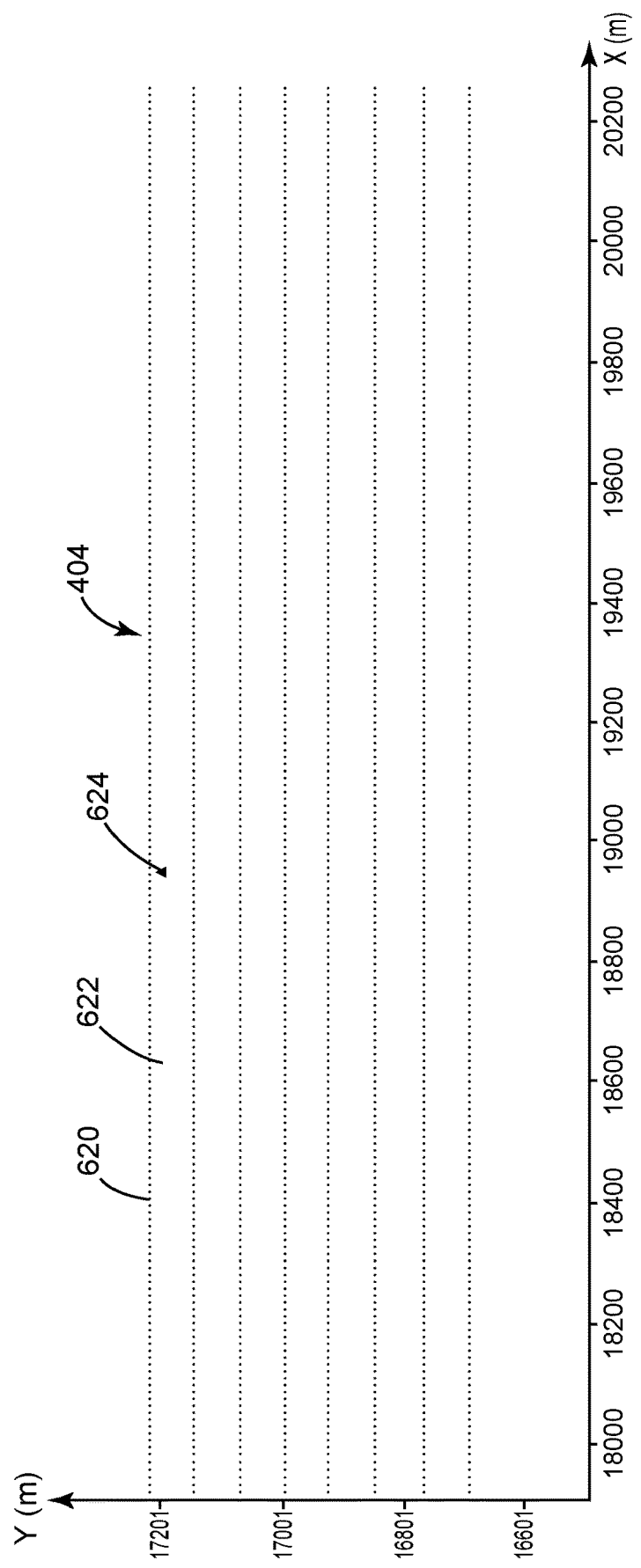

FIG. 6A shows the locations 620 at which the seismic data is acquired with the seismic receivers distributed along the streamers when a single shot is considered. One will note that there are many empty spaces along each streamer 404, where no seismic data is recorded, and especially a lot of empty spaces 622 between the streamers, where no seismic data is acquired. A target location 624 between the streamers is also shown in FIG. 6A. In FIG. 6A, the various locations are identified by their coordinates on the inline direction X (the abscissa in the figure) and the cross-line direction Y (the ordinate in the figure) expressed in meters. FIG. 6A shows a 2 km long portion of the streamer 404.

Figure 6B:
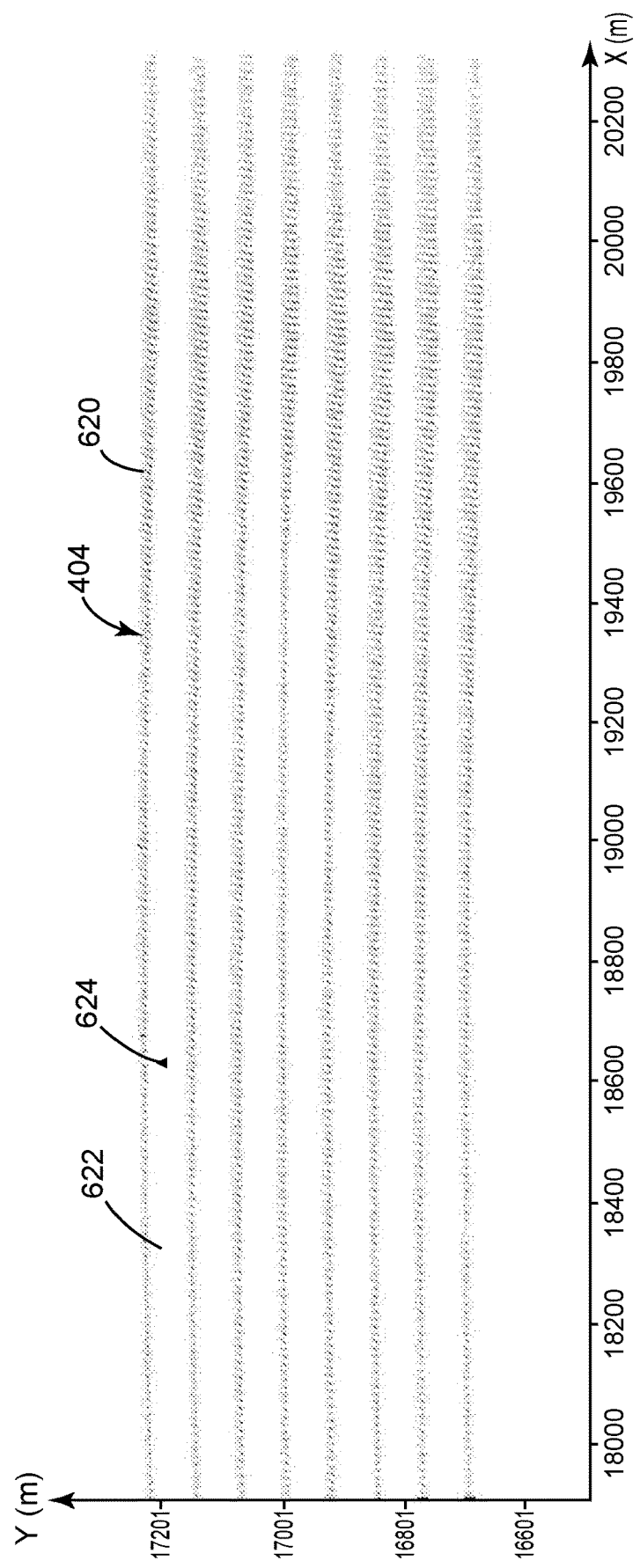

Instead of considering a single shot and interpolating the data for this single shot to find the seismic data at target location 624, as the traditional methods do, the present embodiment allows more time to pass, i.e., more shots are fired and more seismic data is acquired while the streamers move along the pre-plot path, and then, as illustrated in FIG. 6B, spaces 624 were no seismic data is available become narrower.

Figure 6C:
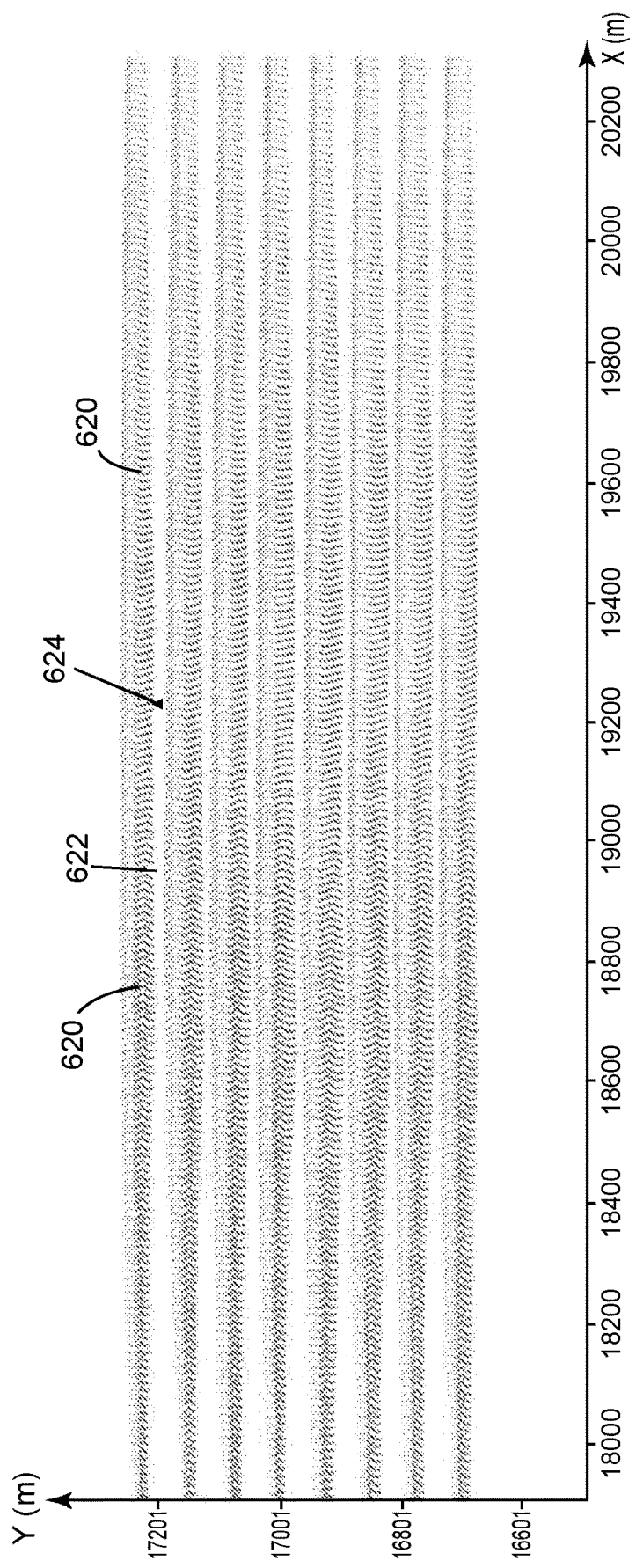

If enough time is allowed, i.e., enough shots are fired, for example, 128 shots as illustrated in FIG. 6C, the acquired seismic data will eventually fill most of the empty spaces 624. FIG. 6C shows that the target location 624 corresponds now to at least one location of a receiver from a streamer where seismic data has been recorded. This is happening because streamer 404 is on purpose made to make a non-zero angle with the pre-plot path (which lies along the inline direction). This specific configuration of the streamer makes the streamers sweep the area underlying the streamer spread (the plurality of streamers), in effect making most of the empty spaces from FIG. 2 to be filled with actual measured seismic data. In other words, because the streamers are deviating along the cross-line direction, while advancing along the inline direction, almost the entire area observed in FIG. 6A is "visited" or "sampled" by one or more seismic receivers for recording the seismic data.

Note that for a specific case in which the vessel speed is about 8 km/h, the streamers have a length of about 10 km, and the source array is shot every 10 s, 128 shots as illustrated in FIG. 6C would take about 21 minutes, which corresponds to about 2 km of streamer passing a given inline position. If even more shots are considered, the empty space 624 between the streamers is almost entirely filled with collected seismic data.

FIG. 6D shows on a single page the effect of considering plural shots for generating a set of recorded seismic data to be used for reconstructing wavefields. It is noted that all the known methods use a single shot, which make the recorded seismic data to be vary sparse (similar to the most left panel in FIG. 6D), while the present embodiment collects many shots, which provides more recorded seismic data to the seismic data reconstruction algorithm (similar to the most right panel in FIG. 6D).

Wavefield Reconstruction

Next, the seismic data reconstruction algorithm is discussed. There are several ways to use the multi-shot seismic data discussed above for calculating new values of the seismic data at locations where at least a seismic receiver has previously been recording the data. This means that as shown in FIG. 6D, although a target location 624 appears to be in between the streamers for a single shot (most left panel), after collecting multiple shots and combining the seismic data associated with these multiple shots, the target location 624 substantially coincides with a location of a seismic receiver that recorded seismic data at one of the multiple shots (most right panel).

One possible implementation of this wavefield reconstruction algorithm is related to the model transform. In this implementation, the seismic data from many receiver locations associated with the multiple shots is used to derive a model, in another domain, of the seismic data. Each receiver location contributes, with a certain weight, to the model. Note that while the recorded seismic data in the space-time domain is very sparse, as illustrated in FIG. 2, the model in the transform domain is continuous, i.e., it provides a value of the transformed data for each point of the transform domain. When the transformed data is later transformed back to the space-time domain, because of the continuous nature of the model, the seismic data can be recreated in the space-time domain at any point, even at a location where no seismic data is available. In addition, the embodiment discussed herein also calculates the seismic data, at a point in the space-time domain, where at least one recorded seismic data has been recorded for one shot of the plural shots. In this embodiment, it is possible that the calculated seismic data at that point is for shot number "n" while the recorded seismic data at that point is for shot number "m," where n and m are different positive integer numbers.

In general, the wavefield reconstruction may work with high dimensional transforms or operators to reconstruct data at the target position 624. While this embodiment relates to model transforms in four spatial dimensions, when only data of lower dimensionality is available, these terms may be omitted.

Single-Component Algorithm

One example of wavefield reconstruction implementation involves receiving a high-density dataset (for example, relating to a high-density ocean bottom node acquisition) with sampling in sht-x/sht-y/rec-x/rec-y and time, where sht-x is the x coordinate of the shooting source, sht-y is the y coordinate of the shooting source, rec-x is the x coordinate of the recording receiver and rec-y is the y coordinate of the recording receiver. The measured or recorded seismic data may include hydrophone measurements. An equation that defines a model "m" representation of the recorded seismic data "d" using basis functions in each of the recorded directions is as follows:

$$d(s_x, s_y, r_x, r_y) = Lm(m_{s_x}, m_{s_y}, m_{r_x}, m_{r_y}), \quad (1)$$

where:
d Recorded seismic data;
m Model domain representation of the recorded seismic data;
L Linear reverse transform operator;
$s_x$, $s_y$ Shot x-/y-coordinates; and
$r_x$, $r_y$ Receiver x-/y-coordinates.

In case the model m is in the tau-p domain, for a frequency slice, f, it is possible to define the transform operator L as:

$$L_p = e^{-2\pi i f s_x p s_x} e^{-2\pi i f s_y p s_y} e^{-2\pi i f r_x p r_x} e^{-2\pi i f r_y p r_y}. \quad (2)$$

In this case, the basis functions include the slownesses $p_{s_x}$, $p_{s_y}$, $p_{r_x}$, $p_{r_y}$ along the acquisition axes and "i" is the square root of minus one. Frequency in Hz is given by f.

Alternatively, a spatial Fourier transform may be used instead of the tau-p transform, which may operate either on a frequency slice or a time slice as indicated by the following equation:

$$L_K = e^{-2\pi i s_x K s_x} e^{-2\pi i s_y K s_y} e^{-2\pi i r_x K r_x} e^{-2\pi i r_y K r_y}. \quad (3)$$

In this case, the basis functions include wavenumbers $K_{s_x}$, $K_{s_y}$, $K_{r_x}$, $K_{r_y}$ along the acquisition axes.

The above examples have been given for single component receiver measurements, e.g., hydrophone data, particle velocity data, or particle acceleration data. Operator L is used to transform the recorded seismic data d to the model m and in this process, the sparse data d generates the model m, which is continuous in the transform domain. Once a target location 624 is determined in the space-time space, the operator L (or its inverse) is used to calculated the new seismic data point $d_{TL}$ at target location 624, based on the model m. As noted above, this means that operator L relies on data d, acquired over multiple shots, for determining the new seismic data $d_{TL}$ at the target location 624. Further, the target location 624 is selected to coincide with the location of at least one receiver that recorded a portion of seismic data d.

Multi-Component Reconstruction with Single Depth Receivers

As an alternative to the single component reconstruction discussed above, this embodiment assumes that the reconstruction algorithm operates on more than one component at the same time, for example, hydrophone data and horizontal particle velocity data. These data may or may not have been wavefield separated (for example filtering out downgoing (ghost) energy or filtering out upgoing (primary) energy) prior to being received. The method would produce a single model m that is simultaneously constrained by both data types in a single inversion.

Based on the concepts outlined in Wang et al., 2014, "Joint hydrophone and accelerometer receiver deghosting using sparse tau-p inversion," SEG 2014 expanded abstracts, this embodiment uses the following relationship, which links acceleration A to the spatial derivative of the pressure wavefield P:

$$\rho(A_x, A_y, A_z) = -\left(\frac{\partial P}{\partial x}, \frac{\partial P}{\partial y}, \frac{\partial P}{\partial z}\right). \quad (4)$$

Then the following equation is solved:

$$\begin{pmatrix} d_h(n) \\ Fd_{ay}(n) \\ Fd_{az}(n) \end{pmatrix} = \begin{pmatrix} L_h(n, m) \\ L_{ay}(n, m) \\ L_{az}(n, m) \end{pmatrix} p(m), \quad (5)$$

where:
$d_h$ recorded hydrophone data;
$d_{ay}$ accelerometer data in the y-direction;
$d_{az}$ accelerometer data in the z-direction;
p tau-$p_{sx}$-$p_{sy}$-$p_{rx}$-$p_{ry}$ model;

$$L_h = e^{-2\pi i f s_x P s_x} e^{-2\pi i f s_y P s_y} e^{-2\pi i f r_x P r_x} e^{-2\pi i f r_y P r_y};$$

$$L_{ay} = -\frac{2\pi i f p_{r_y}}{\rho} e^{-2\pi i f s_x P s_x} e^{-2\pi i f s_y P s_y} e^{-2\pi i f r_x P r_x} e^{-2\pi i f r_y P r_y};$$

$$L_{az} = -\frac{2\pi i f p_{r_z}}{\rho} e^{-2\pi i f s_x P s_x} e^{-2\pi i f s_y P s_y} e^{-2\pi i f r_x P r_x} e^{-2\pi i f r_y P r_y};$$

F is a low cut filter (e.g., 15 Hz) to avoid contamination of the model by low frequency accelerometer noise.

The slownesses in equation (5) obey the following relation:

$$\frac{1}{v_w^2} = p_{rx}^2 + p_{ry}^2 + p_{rz}^2. \quad (6)$$

For this and other embodiments, terms relating to unavailable data may be set to zero (e.g., if there is no $A_z$ data available).

Multi-Component Reconstruction with Variable Depth Receivers

In the case the input data contains a plurality of different depths, e.g., the streamers are curved streamers having a variable depth shape, a re-datuming term may be added to the end of each of the above operators, using the slowness in the receiver-z direction to account for the variable depths, as follows:

$$L_h = e^{-2\pi i f s_x P s_x} e^{-2\pi i f s_y P s_y} e^{-2\pi i f r_x P r_x} e^{-2\pi i f r_y P r_y} e^{-2\pi i f r_z P r_z}, \quad (7)$$

$$L_{ay} = -\frac{2\pi i f p_{r_y}}{\rho} e^{-2\pi i f s_x P s_x} e^{-2\pi i f s_y P s_y} e^{-2\pi i f r_x P r_x} e^{-2\pi i f r_y P r_y} e^{-2\pi i f r_z P r_z}, \text{ and} \quad (8)$$

$$L_{az} = -\frac{2\pi i f p_{r_z}}{\rho} e^{-2\pi i f s_x P s_x} e^{-2\pi i f s_y P s_y} e^{-2\pi i f r_x P r_x} e^{-2\pi i f r_y P r_y} e^{-2\pi i f r_z P r_z}. \quad (9)$$

Multi-Component Reconstruction with Input Data Including Receiver Ghosts

The above discussed equations may further be modified to consider the case that the input data includes a receiver side free surface ghost (i.e., up-going and down-going components at the receiver side). In this case, the model equation (5) becomes:

$$\begin{pmatrix} d_h(n) \\ Fd_{ay}(n) \\ Fd_{az}(n) \end{pmatrix} = \begin{pmatrix} L_h^u(n, m) - L_h^d(n, m) \\ L_{ay}^u(n, m) - L_{ay}^d(n, m) \\ L_{az}^u(n, m) + L_{az}^d(n, m) \end{pmatrix} p(m) \quad (10)$$

with the operators L being given as follows:

$$L_h^u = e^{-2\pi i f s_x p_{s_x}} e^{-2\pi i f s_y p_{s_y}} e^{-2\pi i f r_x p_{r_x}} e^{-2\pi i f r_y p_{r_y}} e^{-2\pi i f r_z p_{r_z}}, \quad (11)$$

$$L_{ay}^u = -\frac{2\pi i f p_{r_y}}{\rho} e^{-2\pi i f s_x p_{s_x}} e^{-2\pi i f s_y p_{s_y}} e^{-2\pi i f r_x p_{r_x}} e^{-2\pi i f r_y p_{r_y}} e^{-2\pi i f r_z p_{r_z}}, \quad (12)$$

$$L_{az}^u = -\frac{2\pi i f p_{r_z}}{\rho} e^{-2\pi i f s_x p_{s_x}} e^{-2\pi i f s_y p_{s_y}} e^{-2\pi i f r_x p_{r_x}} e^{-2\pi i f r_y p_{r_y}} e^{-2\pi i f r_z p_{r_z}}, \quad (13)$$

$$L_h^d = e^{-2\pi i f s_x p_{s_x}} e^{-2\pi i f s_y p_{s_y}} e^{-2\pi i f r_x p_{r_x}} e^{-2\pi i f r_y p_{r_y}} e^{+2\pi i f r_z p_{r_z}}, \quad (14)$$

$$L_{ay}^d = -\frac{2\pi i f p_{r_y}}{\rho} e^{-2\pi i f s_x p_{s_x}} e^{-2\pi i f s_y p_{s_y}} e^{-2\pi i f r_x p_{r_x}} e^{-2\pi i f r_y p_{r_y}} e^{+2\pi i f r_z p_{r_z}}, \quad (15)$$

and $$L_{az}^d = -\frac{2\pi i f p_{r_z}}{\rho} e^{-2\pi i f s_x p_{s_x}} e^{-2\pi i f s_y p_{s_y}} e^{-2\pi i f r_x p_{r_x}} e^{-2\pi i f r_y p_{r_y}} e^{+2\pi i f r_z p_{r_z}}. \quad (16)$$

In any of the embodiments using more than one data type, the relative importance of one measurement to another may be modified by inserting weighting factors in the left-hand vector and in the matrix. For example, in one application, it is possible to multiply the $v_y$ terms by a factor of 2 to increase their importance as they will generally be quite weak in amplitude.

Multi-Component Reconstruction with Variable Depth Receivers

This embodiment considers variable depth receivers (see Broadseis technology owned by CGG, France, the assignee of this application) and how the recorded seismic data from such receivers is processed for reconstructing the wavefields at a target location at which at least one of the receivers has recorded seismic data at one shot of the plural shots considered. For simplicity, the description for the following embodiments relate to the case in which the input includes recorded seismic data from a plurality of shots from two streamers and a single source that follows a given pre-plot. FIG. 7A illustrates this acquisition system 700 having two streamers 702 and 704 and a source S that is actuated to shoot a first shot s1. Each streamer has a plurality of receivers 702-1 to 702-3 (only three are shown for convenience) and 704-1 to 704-3. Vessel 706 is shown following the pre-plot path 708, along the inline direction X while towing source S and streamers 702 and 704. Source S can include one or more individual source elements, e.g., an airgun, a vibrator, etc. Although source S can be a source array, it is also possible that source S is a single source element. The links between the vessel and source and streamers are omitted for simplicity. Streamers 702 and 704 make a non-zero deviation angle α with pre-plot direction 708. As previously discussed, the deviation angle can be constant or changing along the length of the streamer. In one application, the deviation angle changes from streamer to streamer. For simplicity, FIG. 7A shows a constant deviation angle α.

While the recorded seismic data will have sht-x/sht-y/rec-x/rec-y coordinates, for one sailline of towed streamer data relating to one source, the sht-y coordinate may be approximately constant or at least vary smoothly without sharp discontinuities along the sailline. As such, for this and all other embodiments, it may be desirable to reduce the dimensionality of the equations for the under-sampled direction, shot-y, by setting all shot-y terms to unity.

It may further be possible to reduce the number of spatial dimensions to 2 by assuming that (1) the shots relate to a single source S which is fired regularly (i.e., at a repeated time interval or space interval), (2) the shots may have been interpolated to reduce aliasing, and (3) the receiver (channel) spacing is an integer factor of the source spacing (e.g., channels 12.5 m mean that there is a receiver or group of receivers every 12.5 m along the streamer and shots at 25 m mean that a distance between two consecutive shots $s_i$ and $s_{i+1}$ is 25 m). The reduced spatial dimensions are illustrated in FIG. 7B, which shows on the X axis the shot number (or shot-x position) of the source array and on the Y axis the receiver locations on the cross-line direction. FIG. 7B illustrates, for simplicity, the cross-line positions of only two receivers 702-2 and 704-2, for the first shot s1.

As the seismic survey is advancing and the vessel moves along the pre-plot path, the number of shots is increasing. FIG. 8A shows system 700 at the one hundredth shot s100, and FIG. 8B shows receivers 702-2 and 704-2 at their respective cross-line positions for this slot.

Note that shot and/or receiver positions referred to in this and other embodiments may relate to receiver positions associated with point receivers, receiver positions of receivers within a receiver array or receiver array center positions. Receiver array summation may be analog or digital, applied during acquisition or after acquisition. Receiver positions may relate to discrete positions at the moment in time the shot fires. Alternatively, receiver positions may be considered as a function of time, varying continuously or semi-continuously, for example positions every 1 ms, every 50 ms, every second, or another temporal sampling which may or may not relate to the receiver data sample interval or the shooting time interval. The receiver positions may be interpolated between the actual positions at which they were recorded. For example, the actual receiver positions may be recorded each time a shot fires, but the recorded receiver positions (e.g., every 10 seconds) may be interpolated so as to vary as a function of the receiver data sampling interval (e.g., every 2 milli-seconds). The interpolation may be based on linear interpolation, cubic interpolation, Fourier interpolation, or another interpolation.

If the locations of the seismic receivers for the 100 shots are combined in a single representation as illustrated in FIG. 9A, then it can be seen that the locations of receivers 702-2 and 704-2, as they move with the vessel between the first shot s1 and the 100$^{th}$ shot s100, describe corresponding lines 702A and 704A. Each one of these lines includes 100 locations of the corresponding seismic receiver at which seismic data has been recorded for the 100 shots. The same lines are shown in FIG. 9B.

If the target location 624, where new seismic data is desired to be reconstructed (also called reconstructed seismic data $d_r$), is selected as indicated in FIG. 9A, then it is possible that either the target location 624 corresponds to a previous position of receiver 702-2, where seismic data has been recorded, or, if this is not the case, the target location 624 is adjusted along line 702A until it coincides with the closest recorded position 702-2 corresponding to shot s; (illustrated as 730 in FIG. 9A) and only then the reconstruction methods discussed above are used for reconstructing the wavefield at the adjusted position 730 (corresponding to receiver 702-2's location for shot $s_i$). This means that the adjusted position 730 is on a streamer for at least one shot of the plural shots. FIG. 9B also illustrates this concept.

To achieve this result, the method selects a sub-set of the full dataset, which includes a trace from each shot relating to a fixed receiver-x position. Thus, instead of selecting the input trace from each shot closest to the target rec-x position, this embodiment still uses plural traces corresponding to plural shots and plural receiver positions and then using the model approach discussed in the previous embodiments, calculates the reconstructed seismic data $d_r$ at the target location. In another application, it is possible to interpolate traces at a fixed rec-x position on a shot by shot basis, for example, using sinc interpolation, Fourier interpolation, fx interpolation, or another interpolation. In still another application, it is possible to consider the input data to be up-going hydrophone data (e.g., after PZ summation) and deghosted Vy data (velocity perpendicular to the streamers). This may also be achieved using one of the methods discussed later.

With regard to the configuration illustrated in FIGS. 9A and 9B, it is possible to reconstruct the wavefields at target location 624 using a one-step approach or a two-step approach, as now discussed.

One-Step Approach

The reconstruction method may use a one-step transform in the sht-x/rec-y domain to derive a Fourier model representing of the recorded seismic data. After finding the Fourier domain, which is continuous, the method reconstructs the seismic data at the desired sht-x/rec-y positions as previously discussed with regard to equation (3). Other interpolators (using models or operators) can be used as discussed previously.

Two-Step Approach

If the reconstruction method uses two steps, the first step interpolates all components of the input seismic data for the target shot position and the second step interpolates the target receiver position.

More specifically, the first step involves interpolating the recorded seismic (e.g., hydrophone and Vy) data with Fourier interpolation (other interpolators can be used as discussed previously) in the sht-x direction to reconstruct data for the required shot, for a plurality of rec-y positions. During the second step, the data from the first step is interpolated to the required target position in the receiver y-direction using a Taylor expansion interpolation (other interpolators can be used as discussed previously).

A method that illustrates the application of the reconstruction process to the recorded seismic data is now discussed with regard to FIG. 10. Method 1000 includes a step 1002 of receiving, at a computing device, an input seismic dataset d relating to a plurality of seismic source excitations. The input seismic dataset includes either pressure data, or particle motion related data or a combination of them. The input seismic dataset d includes recordings generated by at least two different source shots. The two different source shots may be related to a single source or plural sources. The seismic data may be recorded in a marine environment, with seismic receivers located on streamers, autonomous underwater vehicles, or other moving platforms.

In step 1004, the computing device receives a positional data set $d_p$ relating to shot and/or receiver positions of the received seismic dataset d. In other words, as there are plural shots, each shot happening at given locations of the source and the streamers, location information about the positions of the source and/or streamers is collected during the seismic survey at each shot. Note that in one application, only the position of streamers is necessary. This location information makes up the positional data set $d_p$. The location information may be collected, for example, using a GPS located on the vessel, and may include the x and y coordinates of each receiver and each source. In one application, the location information may also include the azimuth angle of each receiver and/or streamer relative to the inline direction, with the azimuth angle's vertex being located on the source.

In step 1006, a receiver target location 624 is provided to the computing device. The target location 624 may be selected by the operator of the computing device or by the computing device itself. The receiver target location 624 may be anywhere within the streamer spread. In step 1008, the computing device calculates an adjusted receiver location 730, based on the positional data and the receiver target location 624. The adjusted receiver location 730 is calculated in such a way that it substantially coincides (within normal tolerances associated with GPS measurements and receiver positioning along the streamers, e.g., in the range of 1 to 5 m) with the location of at least one receiver of the streamer spread, at the time of recording seismic data due to shot $s_i$, where i is one of the shots from the plural shots generating the input seismic dataset d.

In step 1010, the computing device calculates reconstructed seismic data $d_r$ at the adjusted receiver position 730 using the input seismic dataset d and the positional data $d_p$. This step of calculating involves selecting a receiver location from the positional data $d_p$, which is closest to the receiver target location 624. In one application, this step includes convolving an operator with the input seismic data d. In another application, this step includes a Taylor expansion involving the input seismic data d. In still another application, this step includes calculating a structural tensor which is a function of the input seismic data d.

In step 1012, the computing device may correct a path of the seismic waves generated by the source 706 and recorded by receiver 702-2, based on the reconstructed seismic data $d_r$ or generate an image of the subsurface using the reconstructed seismic data $d_r$. The step of correcting the path of the seismic waves may include various seismic processing techniques as migration, normal moveout, noise attenuation (e.g., multiple removal), filtering, stacking or better estimating the velocity of the waves. For more details regarding these or other processing techniques used in the seismic field, see "Seismic Data Analysis: Processing, Inversion, and Interpretation of Seismic Data," by Oz Yilmaz, Society of Exploration Geophysicists, 2001. By correcting the seismic wave's path, an accuracy of the image of the subsurface is improved as each reflector (the reflectors reflect the seismic waves originating from source S and direct them toward receiver 702-2) is better positioned relative to the earth surface. Those skilled in the art know that better locating the reflectors relative to the earth surface improve the quality of the image of the subsurface and the reconstructed seismic data represents seismic wave paths that have a better length and/or direction.

The above method may be summarized as follows. A method for reconstructing seismic data includes a step of receiving at a computing device an input seismic data set d related to plural shots emitted by one or more seismic sources (S), wherein the input seismic data set d is indicative of seismic wave paths from the one or more seismic source (S) to receivers; a step of receiving at the computing device a positional data set $d_p$ relating to recording locations of the receivers that recorded the input seismic data set d; a step of receiving at the computing device a receiver target location; a step of calculating, with the computing device, an adjusted receiver location based on (i) the positional data set $d_p$ and (ii) the receiver target location, wherein the adjusted receiver location substantially coincides with a receiver location from the positional data set $d_p$; a step of calculating, with the computing device, reconstructed seismic data $d_r$ at the adjusted receiver location using the input seismic data set d and the positional data set $d_p$; and a step of correcting the seismic wave paths from the one or more seismic sources (S) to the receivers based on the reconstructed seismic data $d_r$.

The input seismic data set d is acquired with the receivers being located on streamers making a non-zero deviation angle with the pre-plot path. The positional data set includes locations of the receivers distributed along streamers, at instants when the source was fired.

The step of correcting may include generating an image of the subsurface based on the corrected seismic wave paths while the step of calculating the reconstructed seismic data may include applying a domain transform to the input seismic data d to calculate a model m of the input seismic data d, where the model m is in a model domain different from a time-space domain in which the input seismic data d is recorded. The domain transform is achieved with a linear operator L and the model domain m is a Radon domain.

The method may further include a step of applying a reverse transform to the model m, to obtain the reconstructed seismic data in the time-space domain, wherein the model is continuous in the model domain. The reconstructed seismic data $d_r$ at the adjusted receiver location combines all seismic wave paths from the input seismic data set. The wave paths of the input seismic data set contribute with different weights to the reconstructed seismic data.

In one application, the reconstructed seismic data has a lower noise then the input seismic data set because the reconstructed seismic data combines all the wave paths of the input seismic data at the adjusted receiver location. In still another application, the source and the receivers are towed in water.

The step of calculating the reconstructed seismic data may include at least one of: convolving an operator with the input seismic data d, applying a Taylor expansion involving the input seismic data d, or calculating a structural tensor which is a function of the input seismic data d.

In one application, the input seismic dataset may include up-going and down-going wavefields. Alternatively, the input seismic dataset relates to an up-going wavefield or to a down-going wavefield. In one application, the up-going and down-going wavefields are separated prior to wavefield reconstruction.

The separated wavefields may involve producing a dataset representing up-going hydrophone energy and up-going horizontal velocity data. In another application, the up-going and down-going wavefields are separated following wavefield reconstruction. In still another application, the up-going and down-going wavefields are separated at the same time as performing wavefield reconstruction. In one embodiment, the wavefield reconstruction reconstructs a down-going wavefield. The down-going wavefield may be subtracted from a dataset containing up-going and down-going wavefields to estimate an up-going wavefield.

In one embodiment, the wavefield reconstruction reconstructs an up-going wavefield and the up-going wavefield is subtracted from a dataset containing up-going and down-going wavefields to estimate a down-going wavefield.

In another embodiment, the input seismic dataset includes signals from a primary seismic source array and signals from a secondary seismic source array. The secondary seismic source array may be part of the same seismic acquisition system as the primary seismic source array. However, in one application, the secondary seismic source array is not part of the seismic acquisition system relating to the primary seismic source array.

In still another embodiment, an arrival time of a signal from the secondary seismic source array is not consistent in timing with the arrival time of a signal from the primary seismic source array. In one application, the secondary source signal is at least partially attenuated during the wavefield reconstruction.

Returning to the input seismic dataset, it may include recordings that relate to a single component (e.g., hydrophone) or a multi-component (e.g., hydrophone and accelerometer) receiver. Thus, the step of calculating the reconstructed seismic data may use only hydrophone data, or only particle motion data or a mixture of hydrophone and particle motion data. The particle motion receivers may be accelerometers, geophones, particle velocity receivers, differential pressure receivers, or another receiver configured to record directional acoustic waves.

The seismic source array may be a marine source or a land source, which may be one of: an airgun array (synchronous or asynchronous firing), marine vibrator, dynamite, vibroseis or other known sources. The source may be an array, for example consisting of tens of airguns and/or marine vibrators. The sources in the source array may be actuated synchronously (e.g., all airguns firing at the same time or marine vibrators emitting in phase), or asynchronously (e.g., the airguns in an array fire with a pre-determined or random timing).

In one embodiment, the seismic source array and receivers are towed behind the same seismic vessel. In another embodiment, the seismic source array and the receivers are towed behind different vessels. The receivers may be mounted on streamers towed behind a vessel. The configuration may include one streamer being towed, a plurality of streamers being towed, streamers towed horizontally, with a slant, sinusoidal, or with variable depth (e.g., BroadSeis) profile. In one application, the streamers are towed with a plurality of different profiles and/or depths. In another application, the towed streamers are towed parallel to each other. In still another application, the towed streamers are towed in a fan pattern such that the streamer separation at far offsets is greater than that at short offsets.

The towed streamers are positioned using birds or steering units mounted on the streamers. In one application, the streamers are subject to currents in the water. The streamer includes plural sections and the sections include a mixture of hydrophone only sections and multi-receiver sections. The different sections may be disposed on the same streamer or on different streamers.

The seismic receivers may be mounted, instead of streamers, in an autonomous housing, on a source array (e.g., nearfield hydrophones), in a mini-streamer towed beneath the source array, part of an ocean bottom survey (cables or nodes), part of a land acquisition system.

Regarding the positioning data set, it may relate to (x,y) receiver sampling coordinates or (x,y,z) receiver sampling coordinates. In one application, the receiver target depth (z) is the same as the input receiver depth. In another application, the receiver target depth (z) is different from to the input receiver depth. The receiver target position may be a position on a regular grid in (x,y). In one application, the receiver target position relates to a receiver position on a different acquisition, for example, part of a time-lapse acquisition. In addition, the positioning data may include source coordinates in (x,y) or (x,y,z).

The step of selecting the target receiver location involves finding a receiver position in the positional dataset with a minimum x-distance (direction parallel to the streamer) to the receiver target position. Alternatively, the step of selecting involves finding a receiver position in the positional dataset with a minimum y-distance (direction perpendicular to the streamer) to the receiver target position. In another application, the step of selecting involves finding a receiver position in the positional dataset with a minimum z-distance (depth) to the receiver target position. Still in another application, the step of selecting involves finding a receiver position in the positional dataset with a minimum Euclidean distance to the target receiver position. In one application, the positional data relates to positions of point receivers or to the center of receiver group arrays.

Still regarding the positioning of the receivers, in one application, the reconstructed seismic data relates to a source position sampled by the input seismic dataset, or to a source position not sampled by the input seismic dataset. In other words, when the new seismic data (reconstructed seismic data) is calculated, it can correspond to a shot $s_i$. However, in another embodiment, the reconstructed seismic data cannot be associated with any of the plural shots considered in reconstructing the data. The recorded seismic data used for reconstructing the data may be 2D or 3D.

In one application, the reconstructed seismic data relates to a source position that is different than the source location when the recording receiver was at the adjusted receiver position. The recorded seismic data and the positional data may be related to shots from more than one pre-plot path. In one embodiment, the recorded seismic data and the positional data consist of shots from more than one seismic survey. In one application, the target location is already an input position in the positional data.

With regard to the calculating the reconstructed seismic data step 1010, it may involve an inversion. The inversion may be linear or non-linear. The inversion may involve a sparse inversion (e.g., following Trad et al, 2003). The inversion may involve an iterative matching pursuit approach. In this case, a subset of the model is calculated and subtracted from the input data before computing the rest of the model domain. Examples include anti-leakage Fourier transform, generalized matching pursuit (GMP), and multi-channel interpolation by matching pursuit (MIMAP). The sparse inversion may be in time and/or frequency. In one application, the sparse inversion is based on an envelope of a prior estimate of the model. The sparse inversion may be l1 norm, Cauchy norm, or another norm.

In one application, the wavefield reconstructed data has lower noise content than the received seismic data. Step 1010 may be a two-step approach, first interpolating the required shot position for all components, and then interpolating the required receiver position. In another application, step 1010 involves a Taylor expansion, interpolation using directionality tensors or convolution by an operator. This step of reconstructing may operate in one or more spatial dimensions.

Step 1010 may involve derivation of a multi-trace model of the data. The multi-trace model of the data may be a Radon model. The Radon model may be one or more of a linear Radon, hyperbolic Radon, sinusoidal Radon, or parabolic Radon. The multi-trace model may be a migration, a Fourier model, a rank reduction model, an SVD model, a curvelet model, a wavelet model, a ridgelet model, a contourlet model, or another model. The multi-trace model may be in 1, 2, 3, or 4 spatial dimensions.

The step of reconstructing may use 2, 3 or 4 spatial dimensions. The 2 spatial dimensions could relate to shot-x/rec-y coordinates. The 3 spatial dimensions could relate to shot-x/rec-x/rec-y coordinates. The 4 spatial dimensions could be shot-x/shot-y/rec-x/rec-y.

In one application, the recorded seismic data has been interpolated prior to receiving, for example, a shot point interpolation. In another application, the recorded seismic data has been interpolated on to a fixed receiver-x position prior to being received.

Step 1010 of reconstructing may use both hydrophone and accelerometer data, and the accelerometer has data domain confidence weights that are a function of a temporal frequency. As such, the influence of different data types may be limited as a function of frequency based on a signal to noise ratio. For example, accelerometer data may have a low signal-to-noise ratio at low frequencies and be given a low-weight at these frequencies. Signal-to-noise ratio may vary as a function of the ghost notch position or varying noise content of the input data, as such, data may be given a low confidence (sparseness) weight close to the ghost notch positions. Step 1010 may be applied in a time domain or a frequency domain. Thus, step 1010 may operate on a temporal window of data, or a spatial window of data, or on a spatio-temporal window of data.

The method illustrated in FIG. 10 may use a source signature that is compensated, and/or a source ghost which is at least partially attenuated. Step 1010 may use a model that is low rank, e.g., when a subset of model traces have a sparseness weight of zero and are not allowed to contribute to the modelling of the input data. A number of model domains may be determined simultaneously which relate to different spatial windows.

In addition to wavefield separation at the receiver side, wavefield separation or source designature (e.g., debubble or array compensation) may be applied on the source side. In one application, the recorded input data may have been (at least partially) dealiased using normal moveout prior to wavefield reconstruction.

Figure 11:
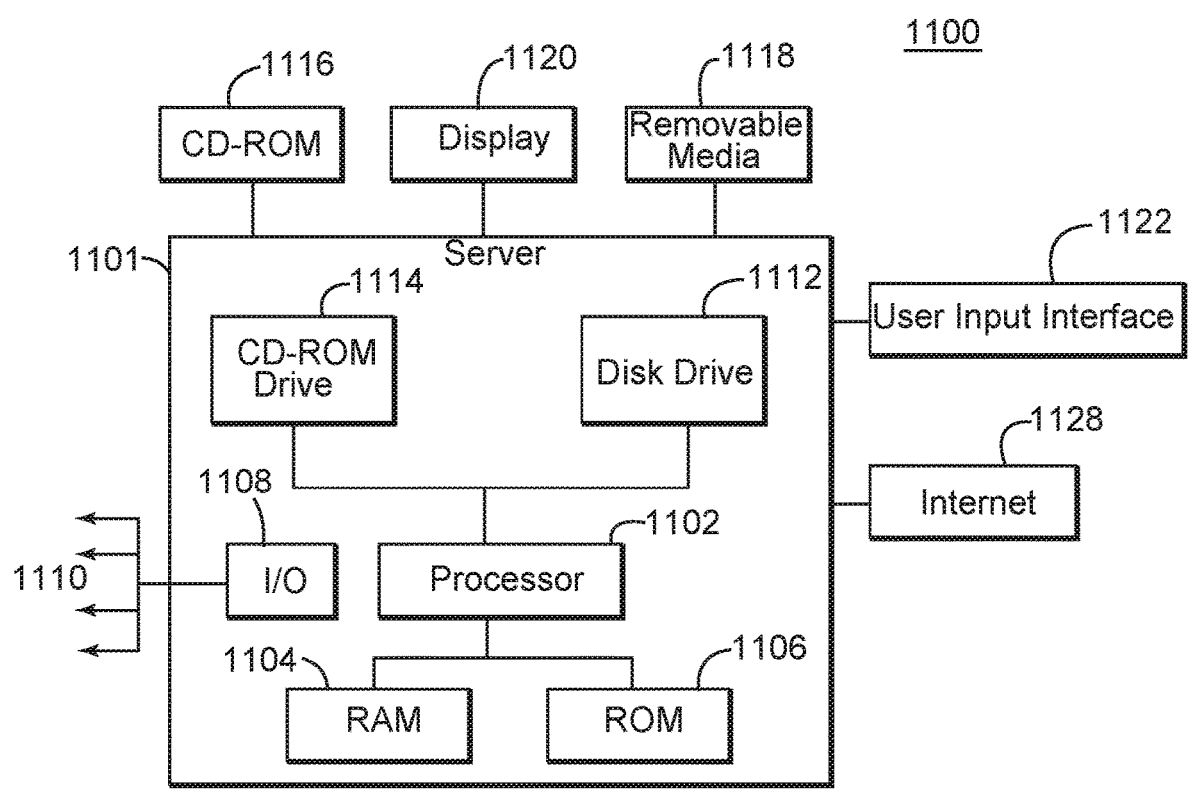
FIG. 11 is a schematic diagram of a computing device configured to implement the above method.

The above-discussed procedures and methods may be implemented in a computing device as illustrated in FIG. 11. Hardware, firmware, software or a combination thereof may be used to perform the various steps and operations described herein. Computing device 1100 of FIG. 11 is an exemplary computing structure that may be used in connection with such a system.

Computing device 1100 suitable for performing the activities described in the exemplary embodiments may include a server 1101. Such a server 1101 may include a central processor (CPU) 1102 coupled to a random access memory (RAM) 1104 and to a read-only memory (ROM) 1106. ROM 1106 may also be other types of storage media to store programs, such as programmable ROM (PROM), erasable PROM (EPROM), etc. Processor 1102 may communicate with other internal and external components through input/output (I/O) circuitry 1108 and bussing 1110 to provide control signals and the like. Processor 1102 carries out a variety of functions as are known in the art, as dictated by software and/or firmware instructions.

Server 1101 may also include one or more data storage devices, including hard drives 1112, CD-ROM drives 1114 and other hardware capable of reading and/or storing information, such as DVD, etc. In one embodiment, software for carrying out the above-discussed steps may be stored and distributed on a CD-ROM or DVD 1116, a USB storage device 1118 or other form of media capable of portably storing information. These storage media may be inserted into, and read by, devices such as CD-ROM drive 1114, disk drive 1112, etc. Server 1101 may be coupled to a display 1120, which may be any type of known display or presentation screen, such as LCD, plasma display, cathode ray tube (CRT), etc. A user input interface 1122 is provided, including one or more user interface mechanisms such as a mouse, keyboard, microphone, touchpad, touch screen, voice-recognition system, etc.

Server 1101 may be coupled to other devices, such as sources, detectors, etc. The server may be part of a larger network configuration as in a global area network (GAN) such as the Internet 1128, which allows ultimate connection to various landline and/or mobile computing devices.

There is a plurality of approaches for interpolation and/or deghosting of seismic data. As these processes are known in the art, their description is omitted herein. Instead, a list of references is provided below for exemplifying these methods. The approaches disclosed in these references use an input seismic data set that includes data generated by a single shot. However, one skilled in the art, having the benefit of this disclosure, would be able to modify these approaches to include more than one shot at a time, for example, by adding a shot axis to the data, as described in FIGS. 7B, 8B and 9B and associated disclosure.

For example, the MIMAP approach described in Vassallo, M., Ozbek, A., Ozdemir, K., and Eggenberger, K, 2010, Crossline wavefield reconstruction from multicomponent streamer data: Part 1—Multichannel interpolation by matching pursuit (MIMAP) using pressure and its crossline gradient, Geophysics, Vol 75, WB53-WB67 derives a model of multi-receiver shot data which may be used for simultaneous deghosting and data reconstruction. By adding a shot axis to the model domain, it is possible to adapt this approach to work on more than one shot, thus providing additional stability to the (generally noisy) accelerometer measurements and reconstruct data to a new shot-receiver position.

The above embodiments have presented various algorithms for processing input seismic data d. These embodiments may be implemented into a computing device such that these calculations are automatically performed. Thus, the processor of a computing device may be configured to execute any of the above discussed steps, in combination or not.

The disclosed embodiments provide a computing device, software instructions and a method for seismic data processing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES RELATING TO TAYLOR EXPANSION AND FILTER BASED APPROACHES

Soubaras, R., Method and apparatus for pre-stack deghosting of seismic data, U.S. Pat. No. 9,322,943.
Wang and Peng, 2012, "Pre-migration deghosting for marine towed streamer data using a bootstrap approach," SEG conference proceedings.

REFERENCES RELATING TO MODEL BASED APPROACHES

U.S. patent application Ser. No. 15/276,961.
Poole, G., 2013, Premigration receiver deghosting and redatuming for variable depth streamer data: Presented at the 83rd Annual International Meeting, SEG.
Wang, P, and Peng, C., Premigration deghosting of seismic data with a bootstrap technique, U.S. Pat. No. 9,435,905.
Poole, G., Device and method for wavefield reconstruction, Patent application publication no. U.S. 2015/0212222.
Poole, G., Device and method for deghosting variable depth streamer data, U.S. 2013/0163376.
Poole, G., Device and method for processing variable depth streamer data, U.S. 2013/0163379.
Poole. G., and King, S., Wavefield reconstruction using a reflection from a variable sea surface, WO 2016/038458.
Poole., G., Method and apparatus for modelling and separation of primaries and multiples using multi-order Green's function, WO 2015/159149.
Poole, G., and King, S., Wavefield reconstruction using a reflection from a variable sea surface, PCT/FR2015/052394.
Wang et al., 2014, "Joint hydrophone and accelerometer receiver deghosting using sparse tau-p inversion," SEG 2014 expanded abstracts.
Wang et al., 2014, "3D joint deghosting and crossline interpolation for marine single-component streamer data," SEG 2014 expanded abstracts.
Wang et al., 2013, "Pre-migration deghosting for marine streamer data using a bootstrap approach in Tau-P domain," SEG Conference and proceedings.
Vassallo, M., Ozbek, A., Ozdemir, K., and Eggengerger, K., 2010, Crossline wavefield reconstruction from multicomponent streamer data: multichannel interpolation by matching pursuit, SEG conference proceedings.
Kamil, Y. I., Vassallo, M., Brouwer, W., Nichols, D., Cowman, M., and Ozbek, A., 2014, Joint crossline reconstruction and 3D deghosting of shallow seismic events from multimeasurement streamer data, EAGE conference proceedings.
Ozbek, A., Vassallo, M., Ozdemir, K., Manen, D, and Eggenberger, K., 2010, Crossline wavefield reconstruction from multi-component streamer data: joint interpolation and 3D up/down separation by generalized matching pursuit, SEG conference proceedings.
Vassallo, M., Ozbek, A., Ozdemir, K., and Eggenberger, K, 2010, Crossline wavefield reconstruction from multicomponent streamer data: Part 1—Multichannel interpolation by matching pursuit (MIMAP) using pressure and its crossline gradient, Geophysics, Vol 75, WB53-WB67.
Ozbek, A., Vassallo, M., Ozdemir, K., Manen, D-J., and Eggenberger, K, 2010 Crossline wavefield reconstruction from multi-component streamer data: Part 2—Joint interpolation and 3D up/down separation by generalized matching pursuit, Geophysics, Vol 75, WB69-WB85.

Ozbek, A., Vassallo, M., Eggenberger, K., Mannen, D-J, and Ozdemir, K., 2012, Joint 3D reconstruction and deghosting of multireceivery streamer data by generalized matching pursuit, Istanbul SEG workshop.

Vassallo, M., Eggenberger, K., Manen, D-J., and Ozdemir, K., 2012, Contributions of the horizontal and vertical components of particle velocity in 3D pressure wavefield reconstruction on dense receiver grids using generalized matching pursuit, SEG conference proceedings.

Poole, G., 2014, "Wavefield separation using hydrophone and particle velocity components with arbitrary orientation," SEG 2014 Annual Meeting, Expanded Abstracts.

Poole, G., Davison, C., Deeds, J., Davies K., and Hampson, G., 2013, Shot-to-shot directional designature using near-field hydrophone data, SEG conference proceedings.

Poole, G., Cooper, J., King, S., and Wang, P., 2015, 3D source designature using source-receiver symmetry in the shot tau-px-py domain, EAGE conference proceedings.

Robertsson, J., Moore, I., and Ozbek, A, 2008, Reconstruction of pressure wavefields in the crossline direction using multicomponent streamer recordings, SEG conference proceedings.

REFERENCES RELATING TO BOTH TAYLOR/FILTER AND MODEL BASED APPROACHES

Robertsson, J. O., Caprioli, P., and Ozdemir, A., Interpolating and deghosting multi-component seismic receiver data, U.S. Pat. No. 7,715,988.

Robertsson, J. O., Marine seismic surveying employing interpolated multi-component streamer pressure data, U.S. Pat. No. 8,775,091.

REFERENCES RELATING TO TENSOR BASED APPROACHES

Ramirez-Peres, Adriana Citali, and Wiik, Torgeir, Method and apparatus for processing seismic data, WO 2016/023598.

Ramirez, A. C., Andersson, F., Wiik, T., and Riste, P. 2015. Data-driven interpolation of multicomponent data by directionality tensors, EAGE conference proceedings.

Andersson, F., Ramirez, C. R., and Wiik, T., 2015, Interpolation of multicomponent streamer data using extended structure tensors. Part 1:Interpolating the pressure field, SEG conference proceedings.

Andersson, F., Ramirez, C. R., and Wiik, T., 2015, Interpolation of multicomponent streamer data using extended structure tensors. Part 2:Interpolating the pressure field's depth derivative, SEG conference proceedings.

GENERAL REFERENCES

Robertsson, J., Moore, I., Vassallo, M., Ozdemir, A. K., van Manen, D-J. and Ozbek, A, 2008, On the use of multicomponent streamer recordings for reconstruction of pressure wavefileds in the crossline direction, Geophysics, 73, A45-A49.

Kazemi, N., and Ramirez, A. C., 2016, Data reconstruction and denoising of different wavefiled components using Green's theorem, EAGE conference proceedings.

Trad, D., Ulrych, T., and Sacchi, M. 2003, Latest views of the sparse Radon transform, Geophysics.

Ruehle, W, Pressure and velocity detectors for seismic exploration, U.S. Pat. No. 4,486,865.

Poole, G., Device and method for weighted sparse inversion for seismic processing, WO 2016/075550.

What is claimed is:

1. A method for reconstructing seismic data, the method comprising:
receiving at a computing device an input seismic data set d related to plural shots emitted by one or more seismic sources (S), wherein the input seismic data set d is indicative of seismic wave paths from the one or more seismic source (S) to receivers;
receiving at the computing device a positional data set $d_p$ relating to recording locations of the receivers that recorded the input seismic data set d;
receiving at the computing device a receiver target location;
calculating, with the computing device, an adjusted receiver location based on (i) the positional data set $d_p$ and (ii) the receiver target location, wherein the adjusted receiver location is a receiver location from the positional data set $d_p$ that is closest to or substantially coincides to the receiver target location;
calculating, with the computing device, reconstructed seismic data $d_r$ at the adjusted receiver location using the input seismic data set d and the positional data set $d_p$; and
correcting the seismic wave paths from the one or more seismic sources (S) to the receivers based on the reconstructed seismic data $d_r$.

2. The method of claim 1, wherein the input seismic data set d is acquired with the receivers being located on streamers making a non-zero deviation angle with a pre-plot path.

3. The method of claim 1, wherein the step of correcting includes:
generating an image of the subsurface based on the corrected seismic wave paths.

4. The method of claim 1, wherein the positional data set includes locations of the receivers distributed along streamers, at instants when the source was fired.

5. The method of claim 1, wherein the step of calculating the reconstructed seismic data comprises:
applying a domain transform to the input seismic data d to calculate a model m of the input seismic data d, where the model m is in a model domain different from a time-space domain in which the input seismic data d is recorded.

6. The method of claim 5, wherein the domain transform is achieved with a linear operator L and the model domain m is a Radon domain.

7. The method of claim 5, further comprising:
applying a reverse transform to the model m, to obtain the reconstructed seismic data in the time-space domain, wherein the model is continuous in the model domain.

8. The method of claim 1, wherein the reconstructed seismic data $d_r$ at the adjusted receiver location combines all seismic wave paths from the input seismic data set.

9. The method of claim 8, wherein the wave paths of the input seismic data set contribute with different weights to the reconstructed seismic data.

10. The method of claim 1, wherein the reconstructed seismic data combines all the seismic wave paths of the input seismic data at the adjusted receiver location.

11. The method of claim 1, wherein the step of calculating the reconstructed seismic data comprises applying a Taylor expansion involving the input seismic data d.

12. The method of claim 1, wherein the step of calculating the reconstructed seismic data comprises:

calculating a structural tensor which is a function of the input seismic data d.

13. A computing device for reconstructing seismic data, the computing device comprising:
an input/output interface for
receiving an input seismic data set d related to plural shots emitted by one or more seismic sources (S), wherein the input seismic data set d is indicative of seismic wave paths from the one or more seismic source (S) to receivers,
receiving a positional data set $d_p$ relating to recording locations of the receivers that recorded the input seismic data set d, and
receiving a receiver target location; and
a processor connected to the input/output interface and configured to,
calculate an adjusted receiver location based on (i) the positional data set $d_p$ and (ii) the receiver target location, wherein the adjusted receiver location is a receiver location from the positional data set $d_p$ that is closest to or substantially coincides to the receiver target location,
calculate reconstructed seismic data $d_r$ at the adjusted receiver location using the input seismic data set d and the positional data set $d_p$, and
correct the seismic wave paths from the one or more seismic sources (S) to the receivers based on the reconstructed seismic data $d_r$.

14. The computing device of claim 13, wherein the input seismic data set d is acquired with the receivers being located on streamers making a non-zero deviation angle with a pre-plot path.

15. The computing device of claim 13, wherein the processor is further configured to:
generate an image of the subsurface based on the corrected seismic wave paths.

16. The computing device of claim 13, wherein the positional data set includes locations of the receivers distributed along streamers, at instants when the source was fired.

17. The computing device of claim 13, wherein the processor is further configured to:

apply a domain transform to the input seismic data d to calculate a model m of the input seismic data d, where the model m is in a model domain different from a time-space domain in which the input seismic data d is recorded.

18. The computing device of claim 13, wherein the reconstructed seismic data $d_r$ at the adjusted receiver location combines all seismic wave paths from the input seismic data set.

19. The computing device of claim 13, wherein the processor is configured to execute at least one of:
applying a Taylor expansion involving the input seismic data d, or
calculating a structural tensor which is a function of the input seismic data d.

20. A non-transitory computer readable medium including computer executable instructions, wherein the instructions, when executed by a processor, implement a method for reconstructing seismic data, the method comprising:
receiving at a computing device an input seismic data set d related to plural shots emitted by one or more seismic sources (S), wherein the input seismic data set d is indicative of seismic wave paths from the one or more seismic source (S) to receivers;
receiving at the computing device a positional data set $d_p$ relating to recording locations of the receivers that recorded the input seismic data set d;
receiving at the computing device a receiver target location;
calculating, with the computing device, an adjusted receiver location based on (i) the positional data set $d_p$ and (ii) the receiver target location, wherein the adjusted receiver is a receiver location from the positional data set $d_p$ that is closest to or substantially coincides to the receiver target location;
calculating, with the computing device, reconstructed seismic data $d_r$ at the adjusted receiver location using the input seismic data set d and the positional data set $d_p$; and
correcting the seismic wave paths from the one or more seismic sources (S) to the receivers based on the reconstructed seismic data $d_r$.

* * * * *